(12) United States Patent
Matsuno

(10) Patent No.: US 6,409,604 B1
(45) Date of Patent: *Jun. 25, 2002

(54) COMPUTER READABLE PROGRAM PRODUCT, METHOD OF CONTROLLING DISPLAY OF GAME AND GAME SYSTEM

(75) Inventor: Yasumi Matsuno, Tokyo (JP)

(73) Assignee: Square Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,179

(22) Filed: Mar. 29, 2000

(30) Foreign Application Priority Data

Jun. 30, 1999 (JP) .............................. 11-185575

(51) Int. Cl.⁷ ................................................ A63F 13/00
(52) U.S. Cl. ................................ 463/43; 463/8; 463/32; 463/44; 463/31
(58) Field of Search ............................ 463/30–32, 34, 463/36, 43, 8

(56) References Cited

U.S. PATENT DOCUMENTS

| | | | | | |
|---|---|---|---|---|---|
| 5,947,823 A | * | 9/1999 | Nimura | ...................... | 463/32 |
| 6,001,017 A | * | 12/1999 | Okano et al. | .................. | 463/43 |
| 6,007,428 A | * | 12/1999 | Nishiumi et al. | .............. | 463/36 |
| 6,102,800 A | * | 8/2000 | Kitahara et al. | .............. | 463/29 |
| 6,126,544 A | * | 10/2000 | Kojima | ......................... | 463/31 |
| 6,146,275 A | * | 11/2000 | Asai et al. | ..................... | 463/31 |
| 6,146,277 A | * | 11/2000 | Ikeda | .......................... | 463/43 |
| 6,210,273 B1 | * | 4/2001 | Matsuno | ........................ | 463/8 |

FOREIGN PATENT DOCUMENTS

| | | |
|---|---|---|
| JP | 10156042 | 6/1998 |
| JP | 11313978 | 11/1999 |
| WO | 97/36261 | 10/1997 |

OTHER PUBLICATIONS

English Language Abstract of JP 10–156042.
No. 1 Fighting Studio, "Sega Saturn Perfect Capture Series 18 Daisenryaku—Strong Style—A Surefire Recipe of Capture", First Printing, Futabasha K.K., Jul. 10, 1997, pp. 20, with English translation.

* cited by examiner

*Primary Examiner*—Joe H. Cheng
*Assistant Examiner*—Carmen D. White
(74) *Attorney, Agent, or Firm*—Greenblum & Bernstein, P.L.C.

(57) ABSTRACT

A computer readable program product and method of controlling the display of a game three-dimensionally display an area showing the effective range of an attack when setting an attack. The data of a range area and effect area are set for each type of "magic" in advance. The range area of magic selected by a player is displayed on a screen at the time of a fight and an effect area is set by an input operation of the player at any position in the range area. The effect of the attack thus reaches the inside of the effect area by execution of the attack. The modes of the fight scene become more diverse and the tactical nature and interest of the game are thus enhanced.

28 Claims, 24 Drawing Sheets

| | CHARACTER | REFERENCE COORDINATE DATA |
|---|---|---|
| | PLAYER CHARACTER | Pa(Xa,Ya,Za) |
| FIGHT OPPONENT | ENEMY CHARACTER A | Pb(Xb,Yb,Zb) |
| | ENEMY CHARACTER B | Pc(Xc,Yc,Zc) |
| | ⋮ | ⋮ |

Fig. 4

| MAGIC | RANGE AREA DATA | | | EFFECT AREA DATA | | |
|---|---|---|---|---|---|---|
| | SHAPE | SIZE | ANGLE | SHAPE | SIZE | ANGLE |
| SOLID SHOCK | PYRAMID | (X1,Y1,Z1) | 0 | PYRAMID | (x1,y1,z1) | 0 |
| FIREBALL | HEMISPHERE | (X2,Y2,Z2) | 0 | SPHERE | (x2,y2,z2) | 0 |
| AQUABLAST | CYLINDER | (X3,Y3,Z3) | 0 | SPHERE | (x3,y3,z3) | 0 |
| METEOR IMPACT | PRISM | (X4,Y4,Z4) | 0 | PRISM | (x4,y4,z4) | 0 |
| LUFT ATTACK | CONE | (X5,Y5,Z5) | 90 | CONE | (x5,y5,z5) | 0 |
| CURSE | CYLINDER | (X6,Y6,Z6) | 90 | CYLINDER | (x6,y6,z6) | 90 |
| HEAL | SPHERE | (X7,Y7,Z7) | 0 | CYLINDER | (x7,y7,z7) | 90 |
| ----- | ----- | ----- | ----- | ----- | ----- | ----- |

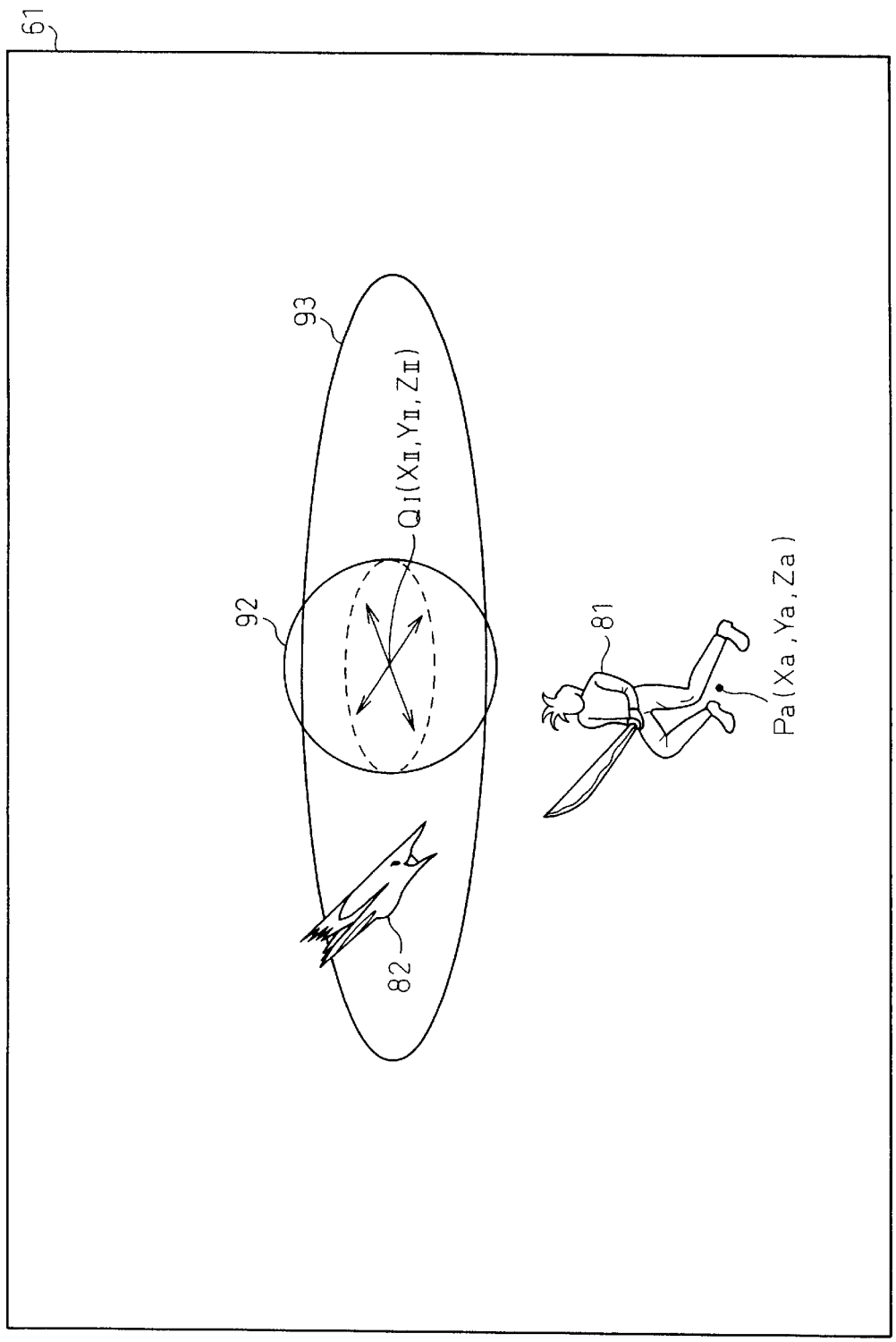

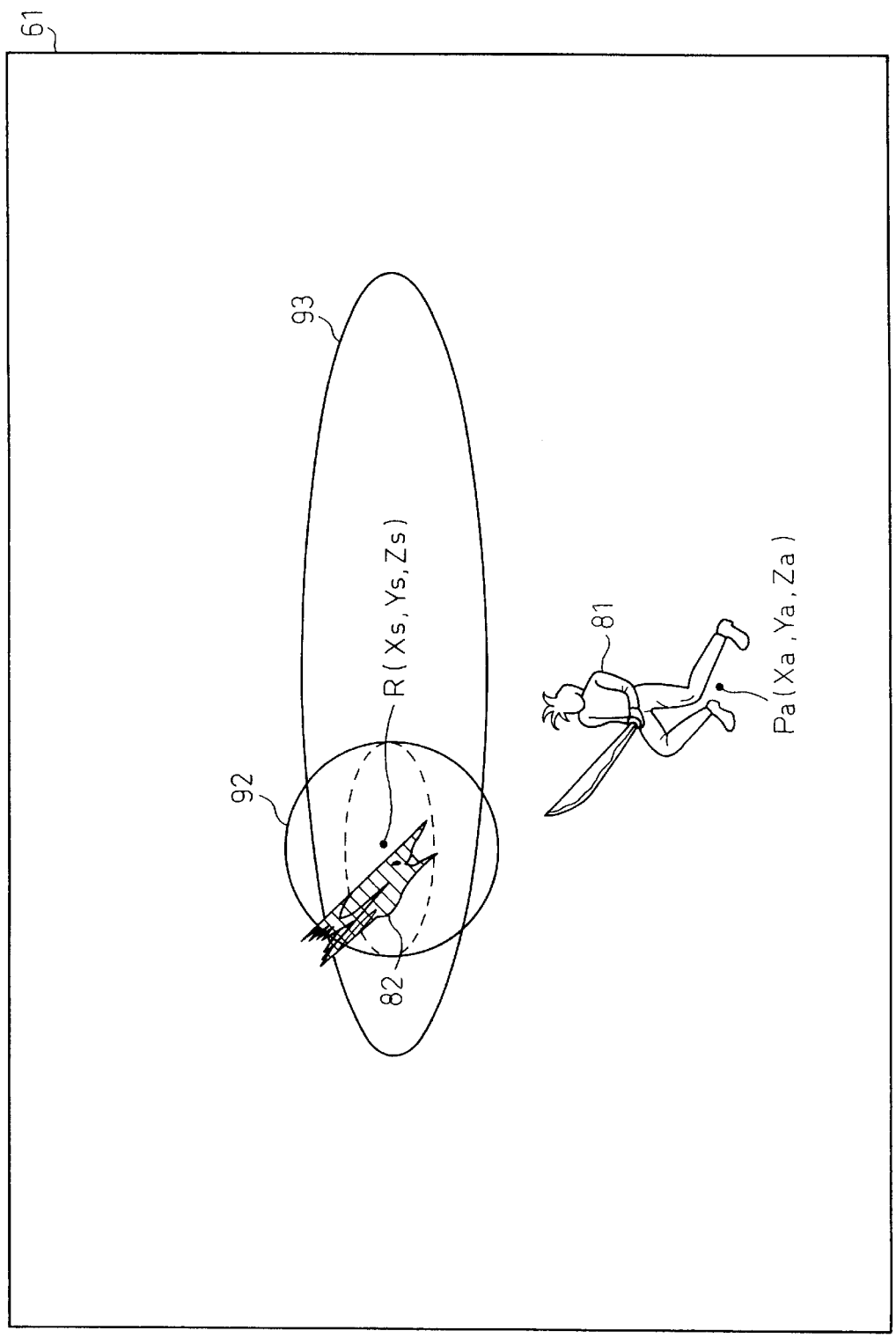

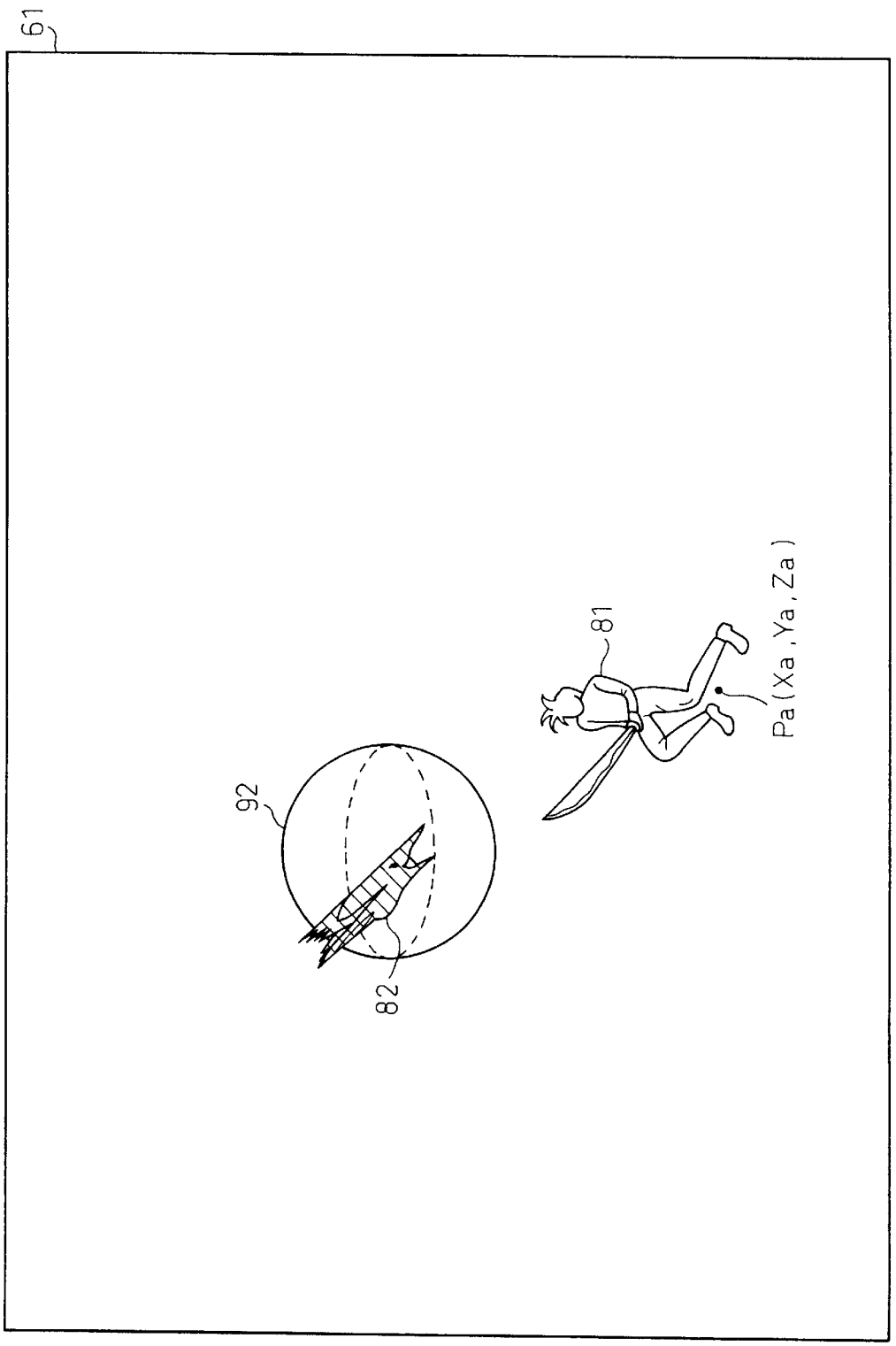

Fig. 25

| CHARACTER NAME | STANDBY TIME DATA (COUNT) |
|---|---|
| PLAYER CHARACTER | 50 |
| ENEMY CHARACTER A | 78 |
| ENEMY CHARACTER B | 93 |
| ENEMY CHARACTER C | 46 |
| ENEMY CHARACTER D | 71 |
| ⋮ | ⋮ |

Fig. 26

| CHARACTER NAME | | REFERENCE COORDINATE DATA | COUNT TIME (COUNT VALUE) |
|---|---|---|---|
| PLAYER CHARACTER | | Pa(Xa,Ya,Za) | 13 |
| FIGHT OPPONENT | ENEMY CHARACTER A | Pb(Xb,Yb,Zb) | 34 |
| | ENEMY CHARACTER B | Pc(Xc,Yc,Zc) | 93 |
| | ⋮ | ⋮ | ⋮ |

COMPUTER READABLE PROGRAM PRODUCT, METHOD OF CONTROLLING DISPLAY OF GAME AND GAME SYSTEM

BACKGROUND OF THE INVENTION

1. Field of the Invention

The present invention relates to a program product storing a program for controlling a computer, a method of control of the display of a game, and an apparatus using the same.

2. Description of the Related Art

There are many types of video games on the market. One of these pits a player character operated by a player against an enemy character controlled by the computer so as to fight each other on the display screen. In such a fighting type video game, the attack may be launched not only against the opponent character, but against walls and other simple objects. Therefore, in the present specification, the attacked character or object will be called a "target object". Here, the "opponent" means a character or object controlled by the computer or operated by another player when viewed from one player's side and conversely means a character or object operated by the player when viewed from the computer side.

Some video games display an area showing the range of effectiveness of an attack when setting an attack against an opponent. The player can determine the effective range of an attack before actually launching the set attack by viewing the area showing the effective range displayed on the display screen.

Some conventional video games displaying an area showing the effective range of an attack, display the area showing the effective range of attack two-dimensionally. For example, in simulation games, etc., the technique is employed of displaying one or more squares of an effective range of attack on a checkerboard map by a color different from the squares of the ineffective range of attack or displaying the squares of the effective range of attack enclosed in a frame.

Summarizing the problem to be solved by the invention, recently, some video games arrange the player character or enemy character and other objects in a virtual three-dimensional space and display these objects on a display screen by perspective transformation. In such video games, for example, when a character attacks with a sword, it cannot attack a very high position, that is, up to the top of the virtual three-dimensional space. When attacking with a bow, however, it could attack a high position.

Therefore, displaying three-dimensionally an area showing the effective range of an attack in fight scenes of such video games (attack setting scenes) becomes an important factor in enhancing the tactical elements of the game and providing a more interesting game. That is, in fight scenes (attack setting scenes), it is important to devise various ingenious methods of controlling the display relating to attacks such as the method of displaying an area showing the effective range of attack.

SUMMARY OF THE INVENTION

An object of the present invention is to display three-dimensionally an area showing the effective range of an attack when setting an attack and thereby enhance the tactical elements of the game in the fight scene and provide a more interesting game.

According to a first aspect of the present invention, there is provided a computer readable program product for storing a game program. The product stores a program making the computer set an effective range of an attack on a target object, positioned in an attack area set in a virtual space in response to an operation of a player, based on a position of a player character when the attack is instructed. The computer also displays three-dimensionally the set effective range of attack as an attack area and launches the attack of the player character on the displayed attack area in response to an operation of the player.

According to a second aspect of the present invention, there is provided a computer readable program product for storing a game program. The product stores a program making the computer set an effective range of an attack on a target object, covered by the attack on a display screen, in response to an operation of a player, based on a position of a player character when the attack is instructed. The computer also displays three-dimensionally the set effective range of attack as an attack area, authorizes the attack on a target object positioned in the displayed attack area, and obtains a battle result based on the authorized attack on the target object of the player character.

According to a third aspect of the present invention, there is provided a computer readable program product for storing a game program. The product stores a program making the computer form an attack screen for a player character to a target object covered by an attack on a display screen, display, based on a position of the player character, an attack area three-dimensionally displaying an effective area of an attack on a target object on the attack screen when the attack is instructed in response to input of an operation. The computer also highlights the target object positioned in the displayed attack area, authorizes the attack on the highlighted target object, and obtains a battle result based on the authorized attack on the target object of the player character.

According to a fourth aspect of the present invention, there is provided a method of controlling a display of a game. The method includes setting an effective range of an attack on a target object, positioned in an attack area set in a virtual space in response to an operation of a player, based on a position of a player character when the attack is instructed. The method also includes displaying three-dimensionally the set effective range of attack as an attack area and launches the attack of the player character on the displayed attack area in response to an operation of the player.

According to a fifth aspect of the present invention, there is provided a method of controlling a display of a game. The method includes setting an effective range of an attack on a target object, covered by the attack on a display screen, in response to an operation of a player, based on a position of a player character when the attack is instructed. The method also includes displaying three-dimensionally the set effective range of attack as an attack area, authorizing the attack on a target object positioned in the displayed attack area, and obtaining a battle result based on the authorized attack on the target object of the player character.

According to a sixth aspect of the present invention, there is provided a method of controlling a display of a game. The method includes forming an attack screen for a player character to a target object covered by an attack on a display screen, and displaying, based on a position of the player character, an attack area three-dimensionally displaying an effective area of an attack on a target object on the attack screen when the attack is instructed in response to input of an operation. The method also includes highlighting the target object positioned in the displayed attack area, authorizing the attack on the highlighted target object, and obtaining a battle result based on the authorized attack on the target object of the player character.

According to a seventh aspect of the present invention, there is provided an apparatus including a computer for controlling a program and a program product storing a program for making the computer control the game. The program makes the computer set an effective range of an attack on a target object, positioned in an attack area set in a virtual space, based on a position of a player character when the attack is instructed and display three-dimensionally the set effective range of attack as an attack area.

According to an eighth aspect of the present invention, there is provided an apparatus including a computer for controlling a program and a program product storing a program for making the computer control the game. The program makes the computer set an effective range of an attack on a target object, covered by the attack on a display screen, in response to an input of an operation, based on a position of a player character when the attack is instructed. The computer also displays three-dimensionally the set effective range of attack as an attack area, authorizes the attack on a target object positioned in the displayed attack area, and obtains a battle result based on the authorized attack on the target object of the player character.

According to a ninth aspect of the present invention, there is provided an apparatus including a computer for controlling a program and a program product storing a program for making the computer control the game. The program makes the computer form an attack screen for a player character to a target object covered by an attack on a display screen, and display, based on a position of the player character, an attack area three-dimensionally displaying an effective area of an attack on a target object on the attack screen when the attack is instructed in response to input of an operation. The computer also highlights the target object positioned in the displayed attack area, authorizes the attack on the highlighted target object, and obtains a battle result based on the authorized attack on the target object of the player character.

BRIEF DESCRIPTION OF THE DRAWINGS

These and other objects and features of the present invention will become clearer from the following description of the preferred embodiments given with reference to the attached drawings, in which:

FIG. 4 is a view of a data structure of an area setting table stored in the RAM shown in FIG. 2;

FIG. 20 is a view of an example of a screen display in the battle processing of the first embodiment;

FIG. 21 is a view of an example of a screen display in the battle processing of the first embodiment;

FIG. 22 is a view of an example of a screen display in the battle processing of the first embodiment;

FIG. 25 is a view of a data structure of a standby time table stored in the RAM shown in FIG. 24;

FIG. 26 is a view of a data structure of a fight control table stored in the RAM shown in FIG. 24:

DESCRIPTION OF THE PREFERRED EMBODIMENTS

Preferred embodiments of the present invention will be explained below with reference to the drawings. Note that while the following explanation will be given of the case of application of the present invention to a home game system, the present invention is not limited to home game systems.

(First Embodiment)

Figure 1:
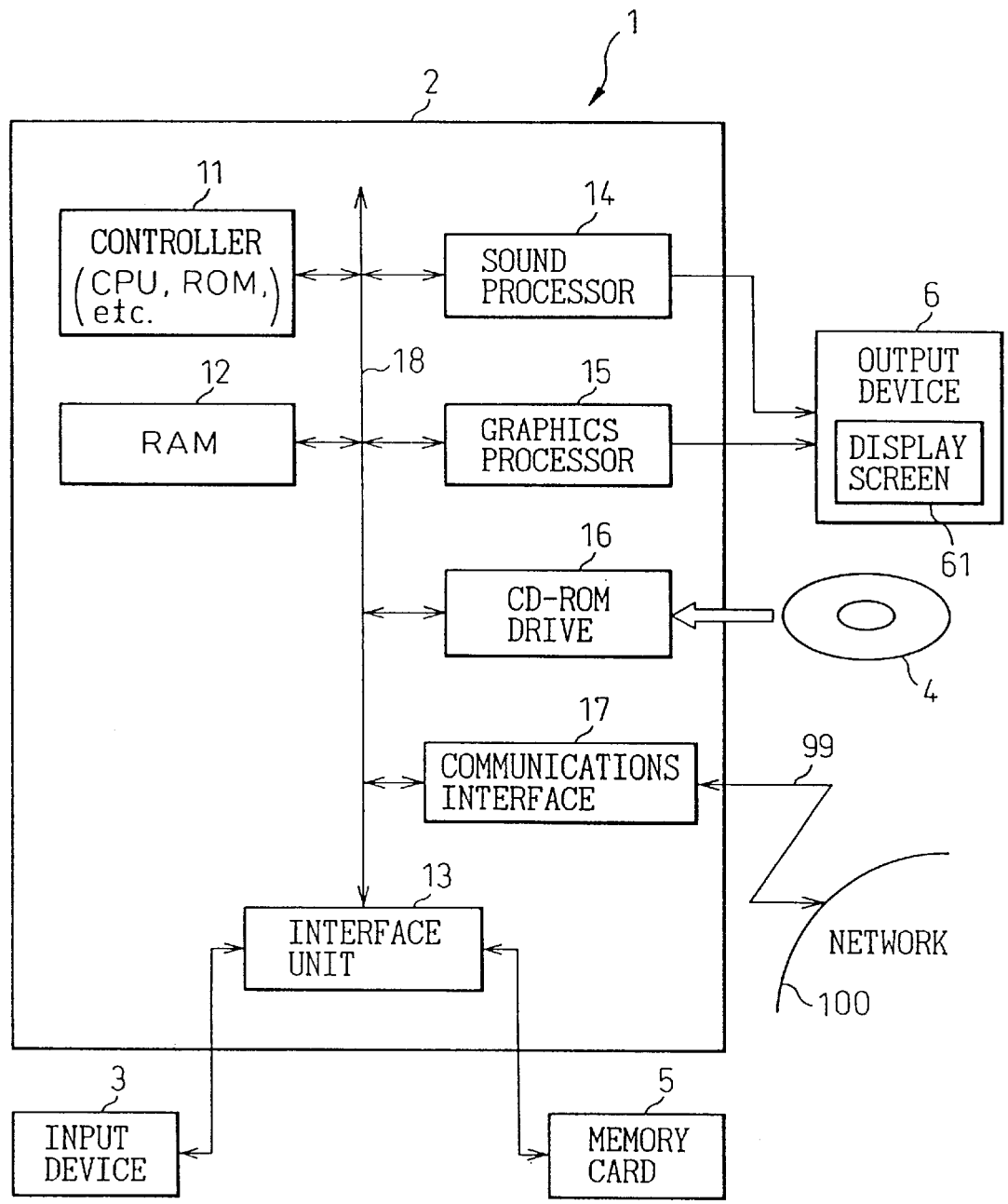
FIG. 1 is a block diagram of the overall configuration of a game system, according to an aspect of the present invention.

FIG. 1 is a block diagram of the overall configuration of a game system according to the present invention.

The game system 1 is, roughly speaking, comprised of a console 2 having the main functions of the game system 1, an input device (controller) 3 for inputting operating instructions to the game system unit 2, a memory card 5 for storing the data of the game in progress, the data on the settings of the game environment, and other data to be saved, and an output device 6 for displaying an image or outputting sound in accordance with the content of the game based on a video signal or audio signal from the game system unit 2.

The console 2 for example is provided with a controller 11, random access memory (RAM) 12, interface unit 13, sound processor 14, graphics processor 15, compact disc read only memory (CD-ROM) drive 16, communications interface 17, and bus 18 connecting these components. Further, the CD-ROM drive 16 is configured to be able to be loaded with a program product 4 such as a CD-ROM storing a program, image data, sound data, etc. for realizing processing relating to the later explained game.

The controller 11 is a circuit comprised of a central processing unit (CPU), read only memory (ROM), etc. The CPU controls the parts in accordance with a program stored in the RAM 12 (in some cases, the ROM). Further, the controller 11 is provided with an oscillator and a timer counter (both not shown). The controller 11 generates a clock signal based on a timing signal output from the oscillator every predetermined interval. The time is counted by counting the clock signals by the timer counter.

The interface unit 13 is configured to be able to be connected to the input device 3 and memory card 5. The interface unit 13 controls the transfer of data between the parts connected to the bus 18 (mainly the controller 11) and the input device 3 or memory card 5.

The sound processor 14 is a circuit having the function of producing background music (BGM) or sound effects for the game. The sound processor 14 generates an audio signal in accordance with commands from the controller 11 based on data stored in the RAM 12. The generated audio signal is output to the output device 6.

The graphics processor 15 is provided with a frame buffer (not shown). The graphics processor 15 draws an image in accordance with commands from the controller 11 on the frame buffer. Further the graphics processor 15 generates a video signal for displaying the image data drawn in the frame buffer. The generated video signal is output to the output device 6.

The CD-ROM drive 16 is a reader for reading data stored in the program product 4, here, the CD-ROM. The game system 1 makes the controller 11 perform control in accordance with a game program stored in the CD-ROM. By this, control relating to the later explained game is realized.

The communications interface 17 is a circuit for control of communications when exchanging various data with another apparatus on a network 100. The communications interface 17 is connected to the network 100 through a communications line 99 as needed.

Figures 2, 3:
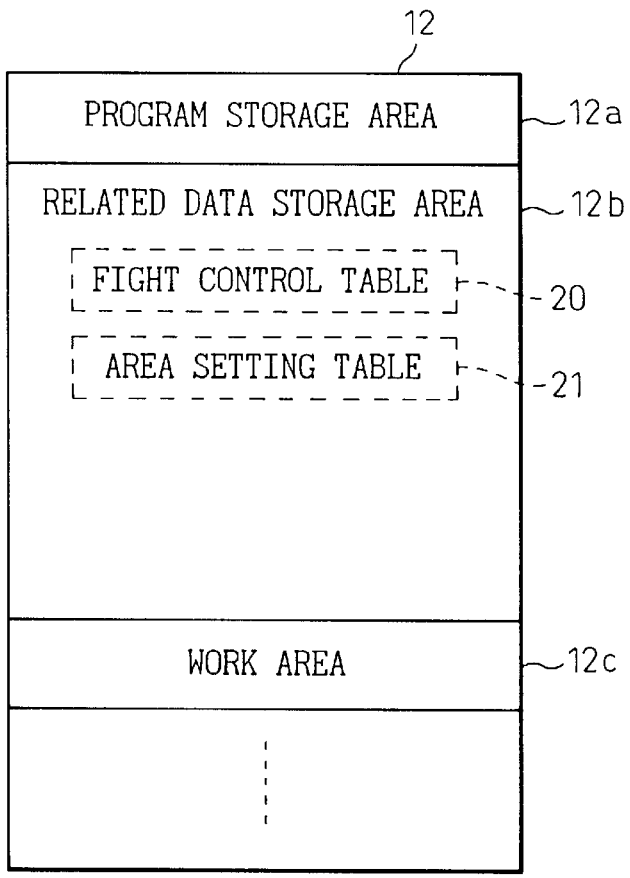
FIG. 2 is a view of a memory configuration of a RAM in a first embodiment.
FIG. 3 is a view of a data structure of a fight control table stored in the RAM shown in FIG. 2.

FIG. 2 is a view of a memory configuration of the RAM 12 shown in FIG. 1.

The RAM 12 has, for example, a program storage area 12a, a related data storage area 12b, and a work area 12c, etc. The program storage area 12a stores the program to be executed by the controller 11. The related data storage area 12b stores the later explained fight control table 20, area setting table 21, and other data required for execution of the various processing during the game.

FIG. 3 is a view of a data structure of the fight control table 20.

The fight control table 20 is a table for storing the data required for control of the fight. The fight control table 20 is configured with, for example, a "CHARACTER" column 201 and "REFERENCE COORDINATE DATA" column 202. The "CHARACTER" column 201 has a player character field and "FIGHT OPPONENT" section 203. The "FIGHT OPPONENT" section 203 stores the names (or character IDs) of the one or more enemy characters fighting with the player character.

The "REFERENCE COORDINATE DATA" column 202 stores the reference coordinate data of the player character and the enemy characters. The reference coordinate data is three-dimensional coordinate data of a reference point provided in each character. This coordinate data is used to specify the current positions of the characters in the three-dimensional virtual space. The reference coordinate data is referred to when displaying a character or when displaying a later explained attack area. The names of the enemy characters stored in the "FIGHT OPPONENT" section 203 are updated for every fight. Further, the reference coordinate data of the characters stored in the "REFERENCE COORDINATE DATA" column 202 is sequentially updated in accordance with the movement of the characters during the fight.

FIG. 4 is a view of a data structure of the area setting table 21.

In this embodiment, when the player character launches an attack, an area showing three-dimensionally the effective range of the attack (hereinafter referred to as the "attack area") is displayed on a display screen 61 of the display of the output device 6. In this embodiment, there are two types of attack areas. One is the effect area showing the area to which the effect of an attack actually reaches when an attack is launched (see FIG. 6). The other is the attackable area showing the range in which the effect area can be set by an input operation (see FIG. 5). For example, the attackable area and effect area are both generated as objects in the three-dimensional virtual space. Further, the attackable area and effect area are three-dimensionally displayed by performing perspective transformation on and displaying the generated objects.

The area setting table 21 shown in FIG. 4 stores data for setting the attackable area and effect area for various types of magic. For example, the area setting table 21 is configured with a "MAGIC" column 211, "RANGE AREA DATA" columns 212, and "EFFECT AREA DATA" columns 213. Here, the "range area" means the attackable area. Below, the attackable area will be referred to as the range area. The "MAGIC" column 21 stores the names (or magic IDs) of the magic which the player character can summon. Here, the "magic" is an act relating to attack, defense, etc. which any character can summon and causes changes in the progress of the game. Note that the attack to which the attackable area or effect area is correspondingly set is not limited to magic. For example, such an attack may also be by a weapon, an attack (bare handed) of the character itself, use of an item, or other act of attack of a character. Further, the attackable area or effect area may also be set for a character in addition to being set corresponding to a type of attack.

The "RANGE AREA DATA" columns 212 have a "SHAPE" column 214, "SIZE" column 215, and "ANGLE" column 216. The "SHAPE" column 214 stores the shape of the area such as a pyramid, hemisphere, column, prism, cone, or sphere. The "SIZE" column 215 stores the size data for defining the size of the shapes of areas stored in the "SHAPE" column 214. The "ANGLE" column 216 stores values of angles defining the inclination of the shapes of areas defined by the size data (for example, 0 degree or 90 degrees).

The "EFFECT AREA DATA" columns 213 have a "SHAPE" column 217, "SIZE" column 218, and "ANGLE" column 219. The "SHAPE" column 217 stores the shape of the area such as a pyramid, hemisphere, column, prism, cone, or sphere. The "SIZE" column 218 stores the size data for defining the size of the shapes of areas stored in the "SHAPE" column 217. The "ANGLE" column 219 stores values of angles defining the inclination of the shapes of areas defined by the size data (for example, 0 degree or 90 degrees).

Next, an explanation will be given of the range area and the effect area.

Figure 5:
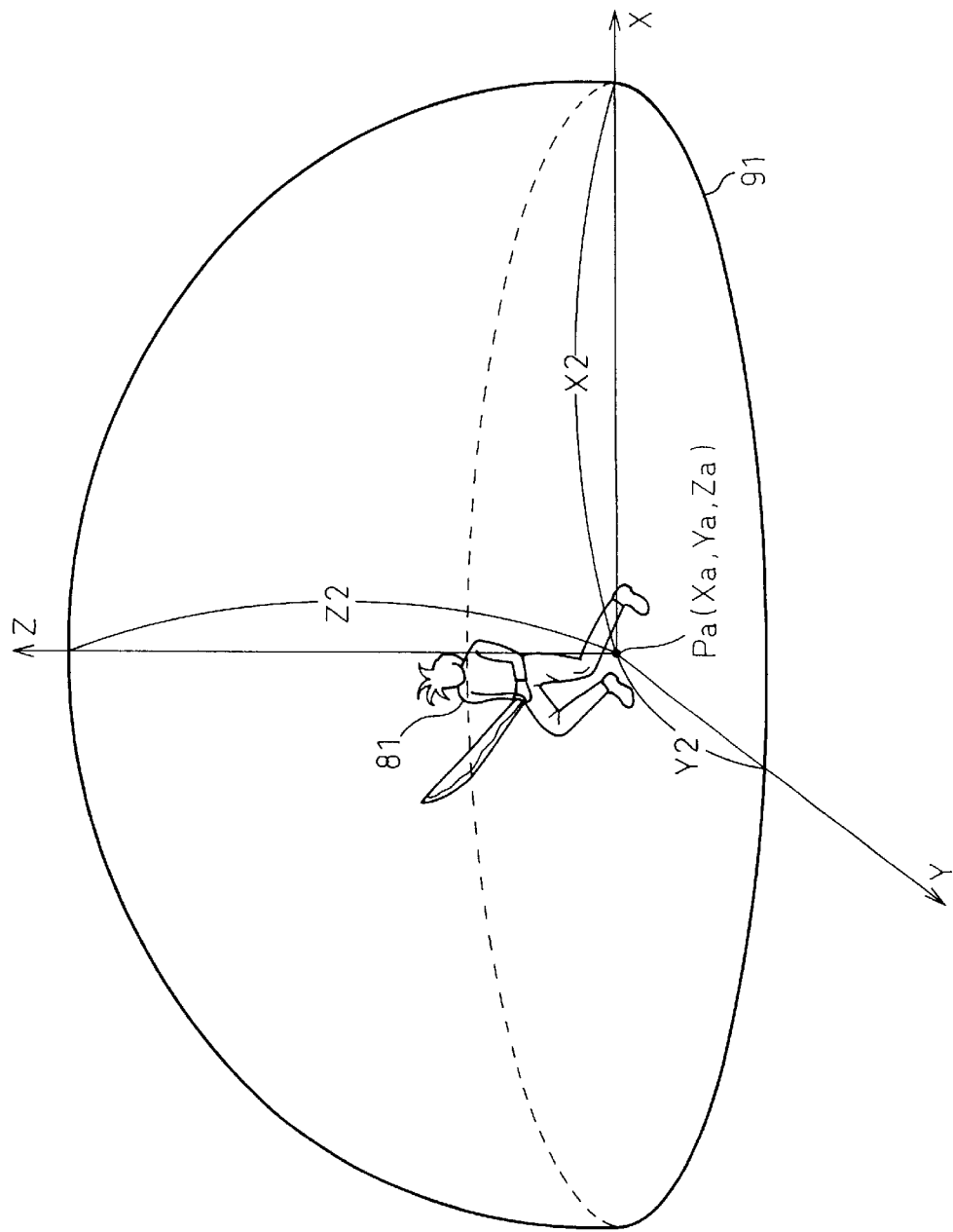
FIG. 5 is a schematic view for explaining an attack area.

FIG. 5 is a schematic view of an example of a range area.

The range area is set in position based on the reference coordinate data $P_a$ ($X_a$, $Y_a$, $Z_a$) of the player character 81. The range area 91 shown in FIG. 5 shows the case where the "SHAPE" column 214 of the area setting table 21 (see FIG. 4) stores a "hemisphere". This hemispherical range area 91 is a virtual hemispherical area defined by the circular plane (bottom surface) formed by equally bisecting a sphere and a hemispherical surface.

This hemispherical range area 91 becomes an area with a bottom surface made parallel to the xy plane of the three-dimensional orthogonal coordinate system, that is, the xyz coordinate system, when the value in the "ANGLE" column 216 is 0 (zero) degree. In this case, the center of the bottom surface matches with the reference coordinate data $P_a$ ($X_a$, $Y_a$, $Z_a$) of the player character 81. Further, the size is defined by the distance to the intersection between the bottom surface and x-axis (X2 in the example shown in FIG. 5), the distance to the intersection between the bottom surface and the y-axis (Y2 in the example shown in FIG. 5), and the distance to the intersection between the hemispherical surface and z-axis (Z2 in the example shown in FIG. 5)—all from the center of the bottom surface. Therefore, the "SIZE" column 215 stores three values, that is, in this example, the values of X2, Y2, and Z2. The "ANGLE" column 216 stores the value of the angle formed between the normal vector of the bottom surface and the z-axis.

Figure 6:
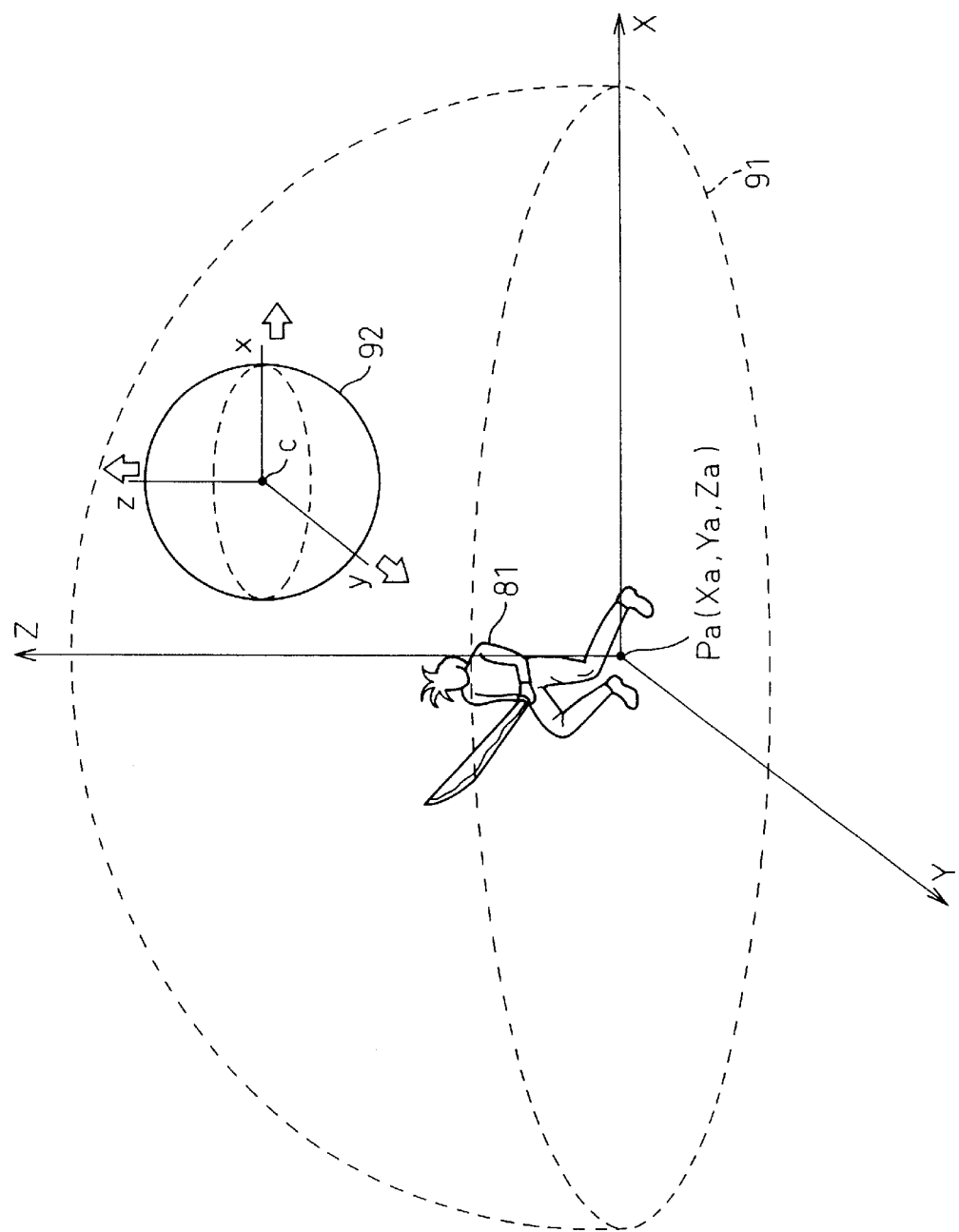
FIG. 6 is a schematic view for explaining an attack area.

FIG. 6 is a schematic view for explaining an effect area.

The effect area 92 shown in FIG. 6 shows an area in the case where the "SHAPE" column 217 of the area setting table 21 stores a "sphere". The effect area 92 can be set to any position in accordance with an input operation from the input device 3 so long as it is in the range area 91.

This spherical effect area 92 is defined by the distance from the center C of the sphere to the intersections of the x-axis, y-axis, and z-axis with the spherical surface in the three-dimensional orthogonal coordinate system, that is, the xyz coordinate system, with its origin at the center C of the sphere, that is, the value of the radius. Therefore, the "SIZE" column 218 stores the values of the radii (same values) in the three directions of the x-axis, y-axis, and z-axis.

FIG. 7, FIG. 8, FIG. 9, and FIG. 10 are schematic views of specific examples of attack areas, that is, range areas and effect areas.

Figure 7:
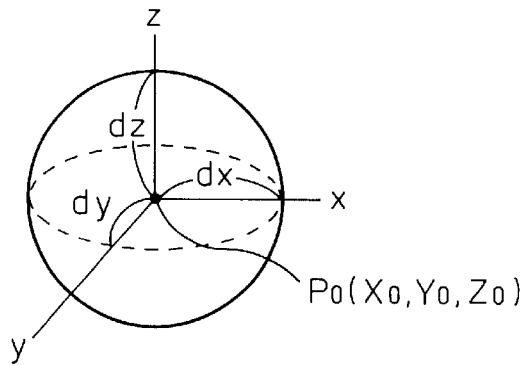
FIG. 7 is a schematic view of a specific example of an attack area.

FIG. 7 shows a spherical attack area. In this case, as explained in relation to FIG. 6, the size of the attack area is defined by the radius $d_x$ ($=d_y=d_z$) of the sphere. Further, when the shape of the area is a sphere, the values of the "ANGLE" columns 216 and 219 of the area setting table 21 (see FIG. 4) become 0 (zero) degrees. Note that in FIG. 7, $P_0$ ($X_0$, $Y_0$, $Z_0$) are the center coordinates of the sphere.

Figure 8:
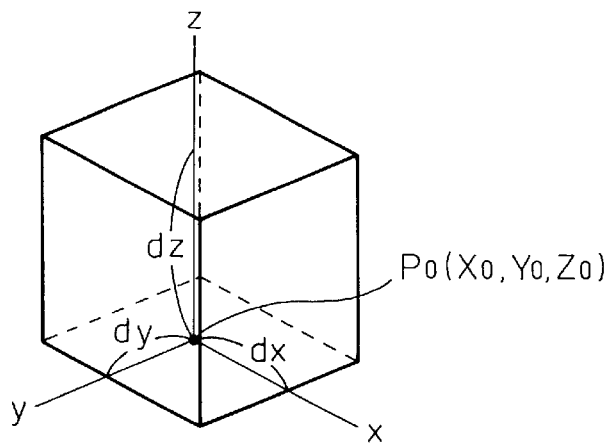
FIG. 8 is a schematic view of a specific example of an attack area.

FIG. 8 shows a cuboid attack area. In this case, the size of the attack area is defined by the distances $d_x$, $d_y$, and $d_z$ from the center to the intersection between the x-axis, y-axis, and z-axis and the faces of the pyramid when the center coordinates $P_0$ ($X_0$, $Y_0$, $Z_0$) of the bottom surface of the pyramid are made the origin of the three-dimensional orthogonal coordinate system, that is, xyz coordinate system. Therefore, the "SIZE" columns 215 and 218 store the values $d_x$, $d_y$, and $d_z$ of the three distances in the x-direction, y-direction, and z-direction. The "ANGLE" columns 216 and 218 store the values of the angles formed between the normal vector of the bottom surface and the z-axis.

Figure 9:
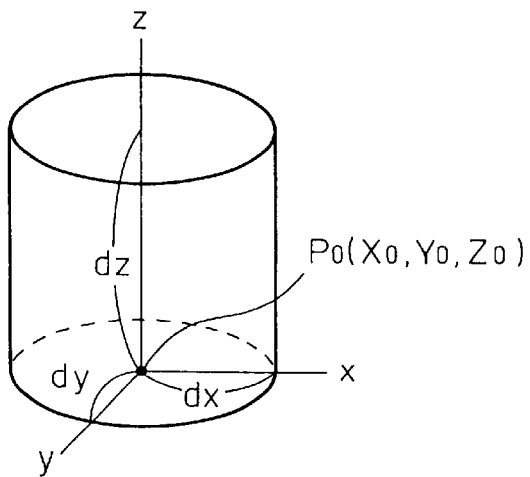
FIG. 9 is a schematic view of a specific example of an attack area.

FIG. 9 shows a cylindrical attack area. In this case, the size of the attack area is defined by the distances $d_x$, $d_y$ ($=d_x$), and $d_z$ from the center to the intersection between the x-axis, y-axis, and z-axis and the side face and top face of the cylinder when the center coordinates $P_0$ ($X_0$, $Y_0$, $Z_0$) of the bottom surface of the cylinder are made the origin of the three-dimensional orthogonal coordinate system, that is, xyz coordinate system. Therefore, the "SIZE" columns 215 and 218 store the values $d_x$, $d_y$, and $d_z$ of the three distances in the x-direction, y-direction, and z-direction. The "ANGLE" columns 216 and 218 store the values of the angles formed between the normal vector of the bottom surface and the z-axis.

Figure 10:
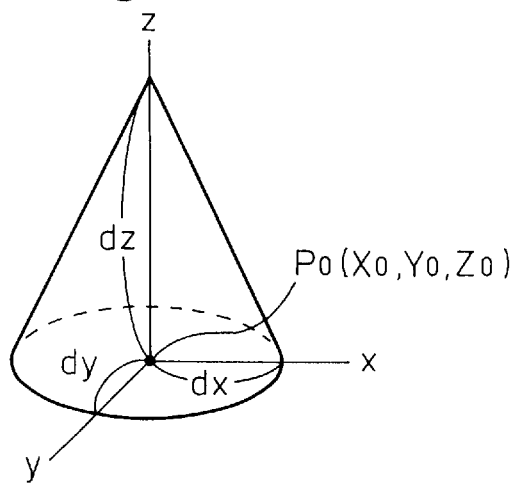
FIG. 10 is a schematic view of a specific example of an attack area.

FIG. 10 shows a conical attack area. In this case, the size of the attack area is defined by the distances $d_x$, $d_y$ ($=d_x$), and $d_x$ from the center to the intersection between the x-axis, y-axis, and z-axis and the side face and peak of the cone when the center coordinates $P_0$ ($X_0$, $Y_0$, $Z_0$) of the bottom surface of the cone are made the origin of the three-dimensional orthogonal coordinate system, that is, xyz coordinate system. Therefore, the "SIZE" columns 215 and 218 store the values $d_x$, $d_y$, and $d_z$ of the three distances in the x-direction, y-direction, and z-direction. The "ANGLE" columns 216 and 218 store the values of the angles formed between the normal vector of the bottom surface and the z-axis.

Figure 11:
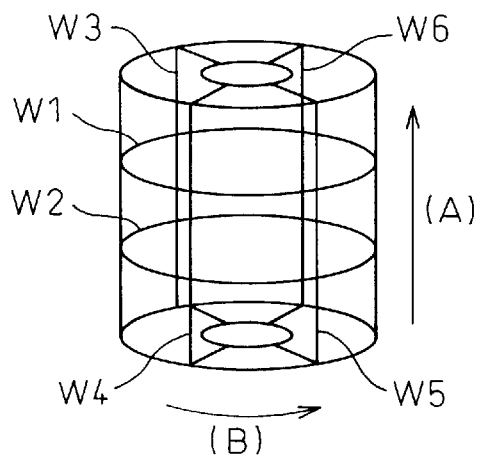
FIG. 11 is a schematic view for explaining an example of a display mode of an attack area.
Figure 12:
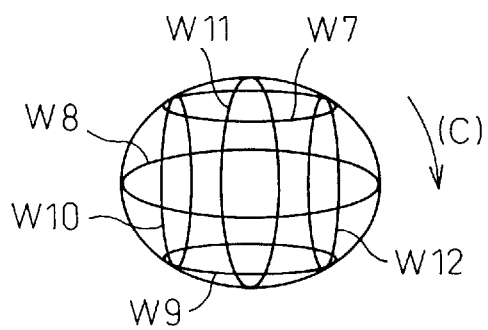
FIG. 12 is a schematic view for explaining an example of a display mode of an attack area.

FIG. 11 and FIG. 12 are schematic views for explaining examples of display modes of attack areas.

FIG. 11 shows the case where the shape of the area is a cylinder, while FIG. 12 shows the case where the shape of the area is a roughly egg-shaped spheroid.

In this embodiment, the attack area, that is, the range area and the effect area, is for example displayed three-dimensionally by a wire frame model. Here, the "wire frame model" is a model showing the contours of an area (here, an attack area) by a plurality of line images, that is, wires. Note that, for example, this may be supplemented by virtual planes or smooth curves formed by coloring between the wires.

Further, in this embodiment, in the wire frame model, the wires move at a constant speed along the contours of the area. By the paths of movement of the wires or by comprehensively viewing all together the paths of movement of the wires, the three-dimensional feeling of the attack area is amplified.

For example, in the case of the cylindrical area shown in FIG. 11, the wires W1 and W2 provided along the sides so as to laterally ring the cylinder move from below to above (or vice versa) as shown by the arrow (A) in the figure. Further, the wires W3, W4, W5, and W6 extending radially out at the top surface, stretching down along the sides in the longitudinal direction, and extending toward the center at the bottom surface so as to divide the cylinder radially longitudinally rotate about the longitudinal axis of the cylinder as shown by the arrow (B) of the figure.

Further, for example, in the case of the ovoid-shaped area shown in FIG. 12, the wires W7, W8, W9, W10, W11, and W12 provided along the sides so as to longitudinally and laterally ring the ovoid move in the direction shown by the arrow (C) in the figure so as to appear that the entire area is rotating.

In this embodiment, at the time of attack, the range of the attack area, that is, the range area and the effect area, is set, the set attack area is positioned in the display and is displayed three-dimensionally based on the position of the player character, the attack on the enemy character in the displayed attack area is authorized, and the result of the fight is obtained. Therefore, the game system 1 is provided with a setting means for setting the effective range of attack, that is, the attack area, an area displaying means for three-dimensionally displaying the attack area, an attack authorizing means for authorizing an attack, and a fight result acquiring means for obtaining the result of the fight. Further, the game system 1 is provided with a highlighting means for highlighting to the player the enemy character in the attack area by changing the mode of display.

The setting means and the attack authorizing means are realized by the controller 11. The area displaying means and the highlighting means are realized by the graphics processor 15. Further, the fight result acquiring means is realized by the controller 11, the sound processor 14, and the graphics processor 15.

Next, a detailed explanation will be given of the operation of the game system 1 according to the present embodiment.

At startup, the controller 11 reads the program and data necessary for execution of the game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11.

Further, the program and data necessary for execution of the game are actually successively read out from the program product 4, that is, the CD-ROM, and transferred to the RAM 12 in accordance with the state of progress of the processing according to commands from the controller 11. In the explanation given below, however, to facilitate understanding of the invention, detailed explanations of the read operation of the data from the CD-ROM and transfer to the RAM 12 are omitted.

Figure 13:
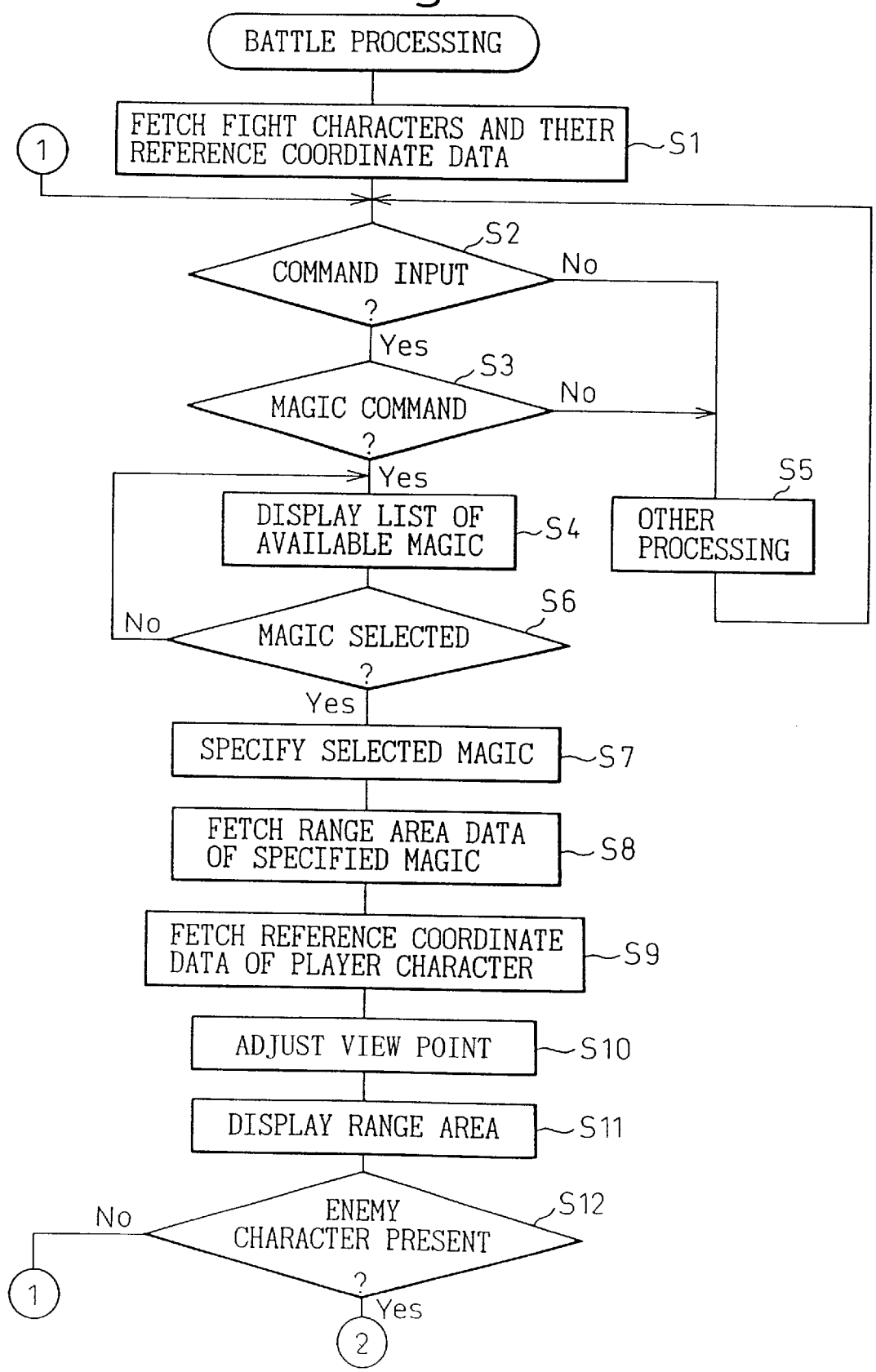
FIG. 13 is a flow chart of battle processing of a first embodiment.
Figure 14:
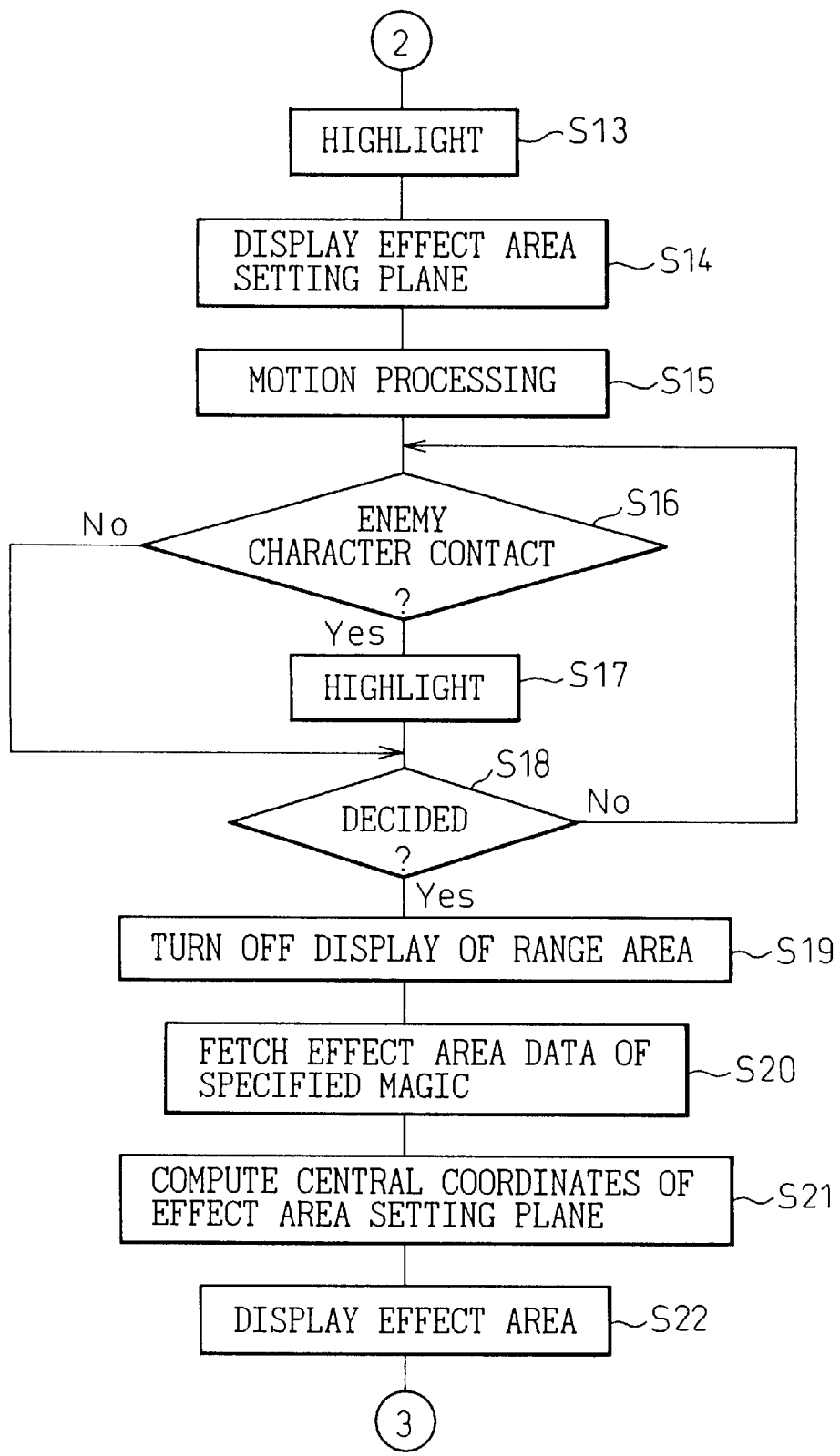
FIG. 14 is a flow chart continuing from FIG. 13.
Figure 15:
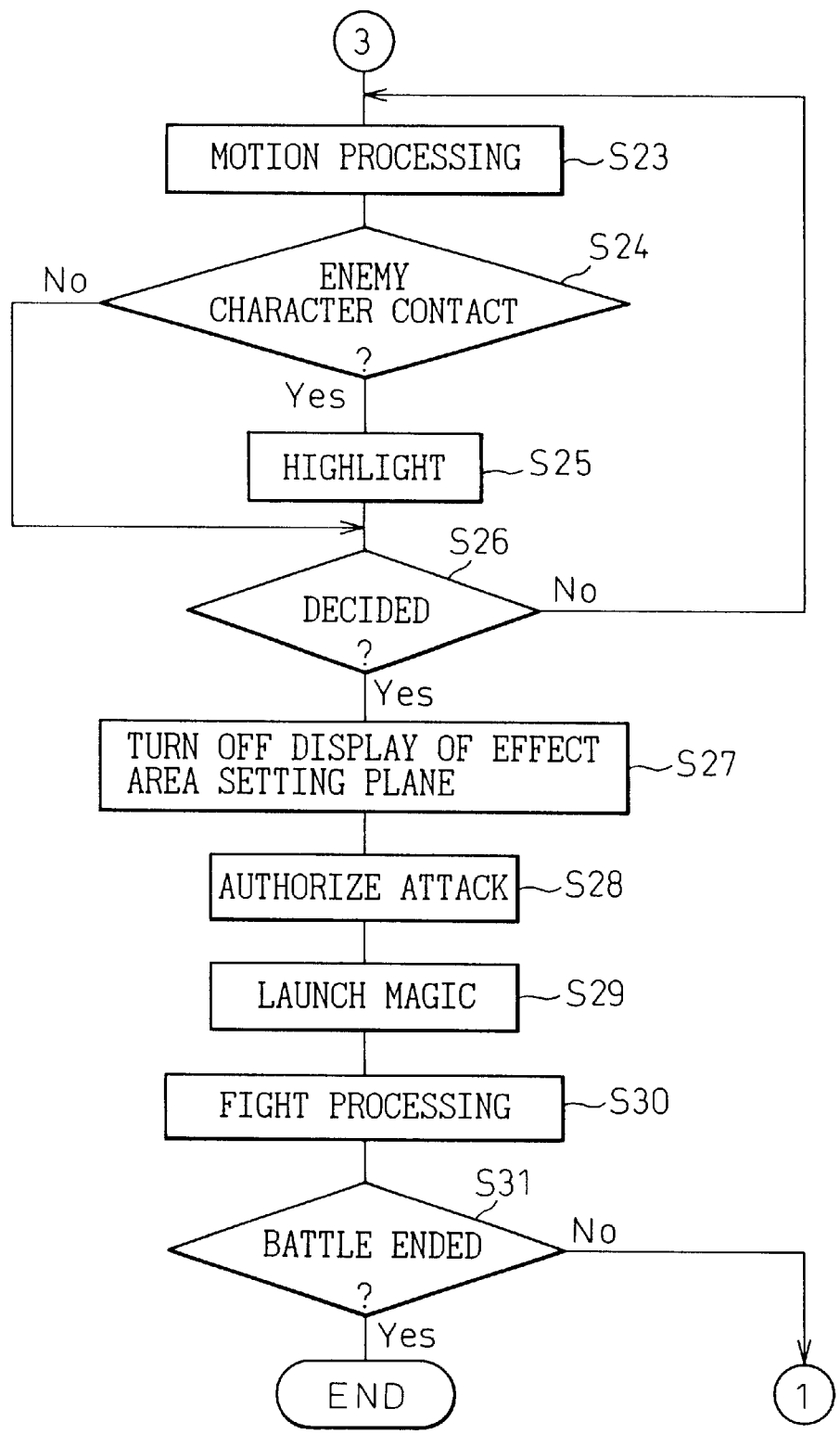
FIG. 15 is a flow chart continuing from FIG. 14.

FIG. 13 to FIG. 15 are flow charts of the battle processing according to an aspect of the present invention.

Next, the battle processing will be explained with reference to examples of the screen displays shown in these figures and in FIG. 16 to FIG. 22.

The battle processing is started when the beginning of a fight with an enemy character is instructed by input of a command during the progress of the game. Alternatively, the battle processing is started when the player character encounters an enemy character based on a predetermined probability during the progress of the game.

As shown in FIG. 13, when battle processing is started, first, the enemy character and the player character displayed on the display screen 61 at the time of start of the battle processing are specified as being covered by the current fight. Next, the reference coordinate data of the specified characters placed in the virtual three-dimensional space is obtained. The information of the specified characters and the reference coordinate data are stored in the fight control table 20 (step S1). Note that the reference coordinate data stored in the fight control table 20 is sequentially updated in accordance with movement of the characters during the fight. Next, it is judged if the input command of the player is a command relating to a fight (step S2).

Figure 16:
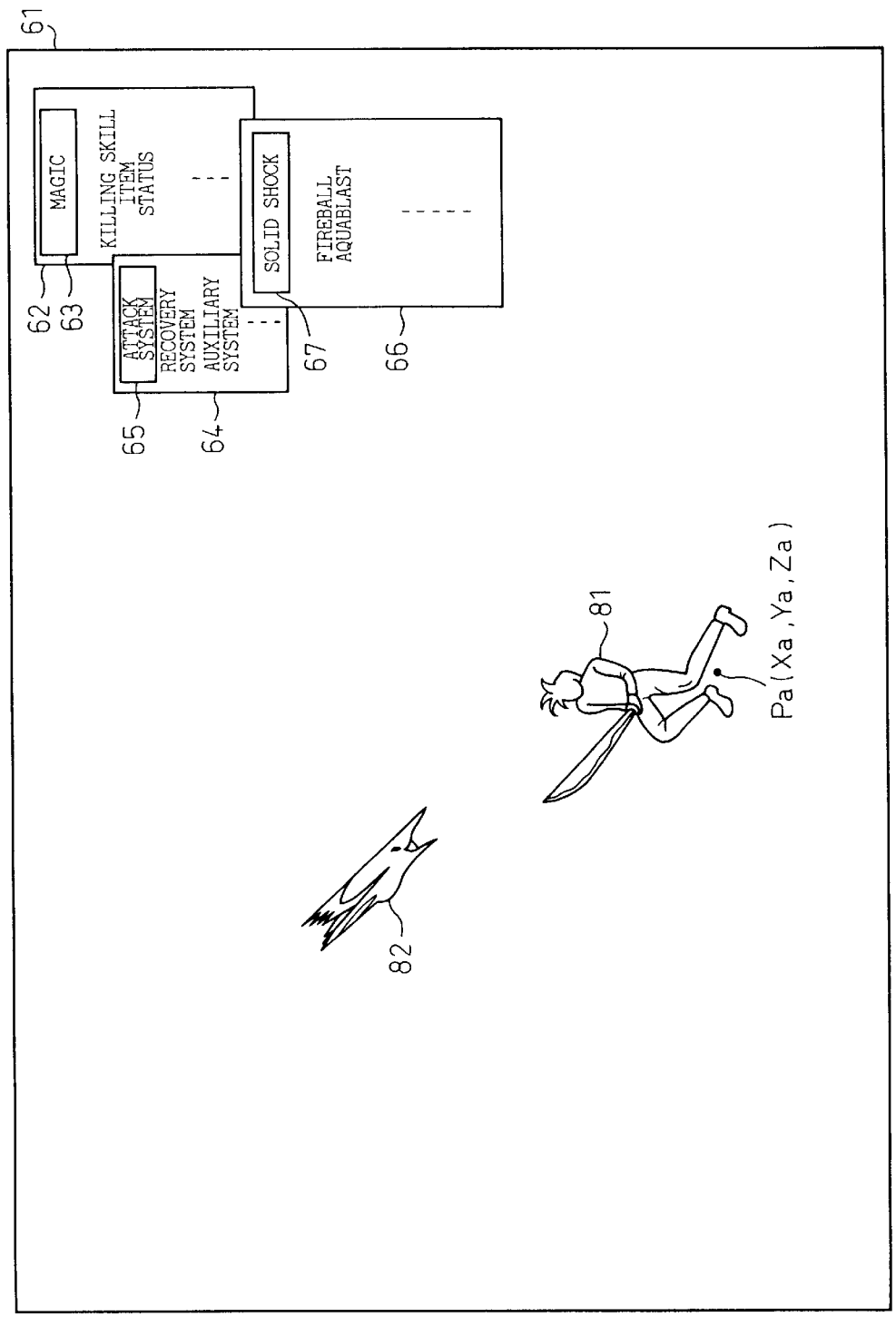
FIG. 16 is a view of an example of a screen display in the battle processing of the first embodiment.

If the input command is a command relating to a fight, as shown by the example of the screen display shown in FIG. 16, a command window 62 is displayed on the display screen 61. The command window 62 displays, for example, the fields of "MAGIC", "KILLING SKILL", "ITEM", and "STATUS". The player can operate controls on the input device 3 to make the cursor 63 displayed in the command window 62 move. This enables any field to be selected in the command window 62.

Returning to FIG. 13, if "MAGIC" is selected by the player, that is, if the input command is a magic command (step S3), a menu window 64 for selecting the type of magic is displayed on the display screen 61 (see FIG. 16). This menu window 64 displays for example "ATTACK SYSTEM", "RECOVERY SYSTEM", "AUXILIARY SYSTEM", and other fields. The player can make the cursor 65 displayed in the menu window 64 move in the same way as the selection operation in the command window 62. This enables any field to be selected in the command window 64.

Next, when the type of magic is selected, the display screen 61 displays a menu window 66. This menu window 66 displays a list of names of available magic in the types of the selected magic (step S4, see FIG. 16). The player can move the cursor 67 displayed in the menu window 66 in the same way as the selection operation in the command window 62 so as to select any magic. On the other hand, when the input command of the player is not a command relating to a fight at step S2, other processing corresponding to that input command is performed (step S5), then the routine returns to step S2. Further, when the command is not a command for magic at step S3, in the same way, other processing corresponding to that input command is performed (step S5), then the routine returns to step S2.

When a list of the available magic is displayed at step S4, that list of magic is displayed until magic is selected by an input operation. When magic is selected (step S6), the display of the command window 62 and menu windows 64 and 66 is erased. Further, the selected magic is specified as the act of attack of the player character (step S7). If the magic is specified, the range area data of the specified magic is obtained based on the area setting table 21 (see FIG. 4) (step S8).

Next, the reference coordinate data of the player character is obtained based on the fight control table 20 (see FIG. 3) (step S9). The display position of the range area is set based on the reference coordinate data of the obtained player character. The position of the view point, the angle of the view point, etc. are adjusted based on the display position of the range area, the reference coordinate data of the player character, and the reference coordinate data of all of the enemy characters obtained at step S1 so that the player character and range area and the enemy characters positioned in and near the range area fit in the display screen 61 (step S 10). Note that the position of the view point, the angle of the view point, etc. may also be adjusted so that the player character, the fight opponents, that is, all the enemy characters, and the range area all fit in the display screen 61.

Figure 17:
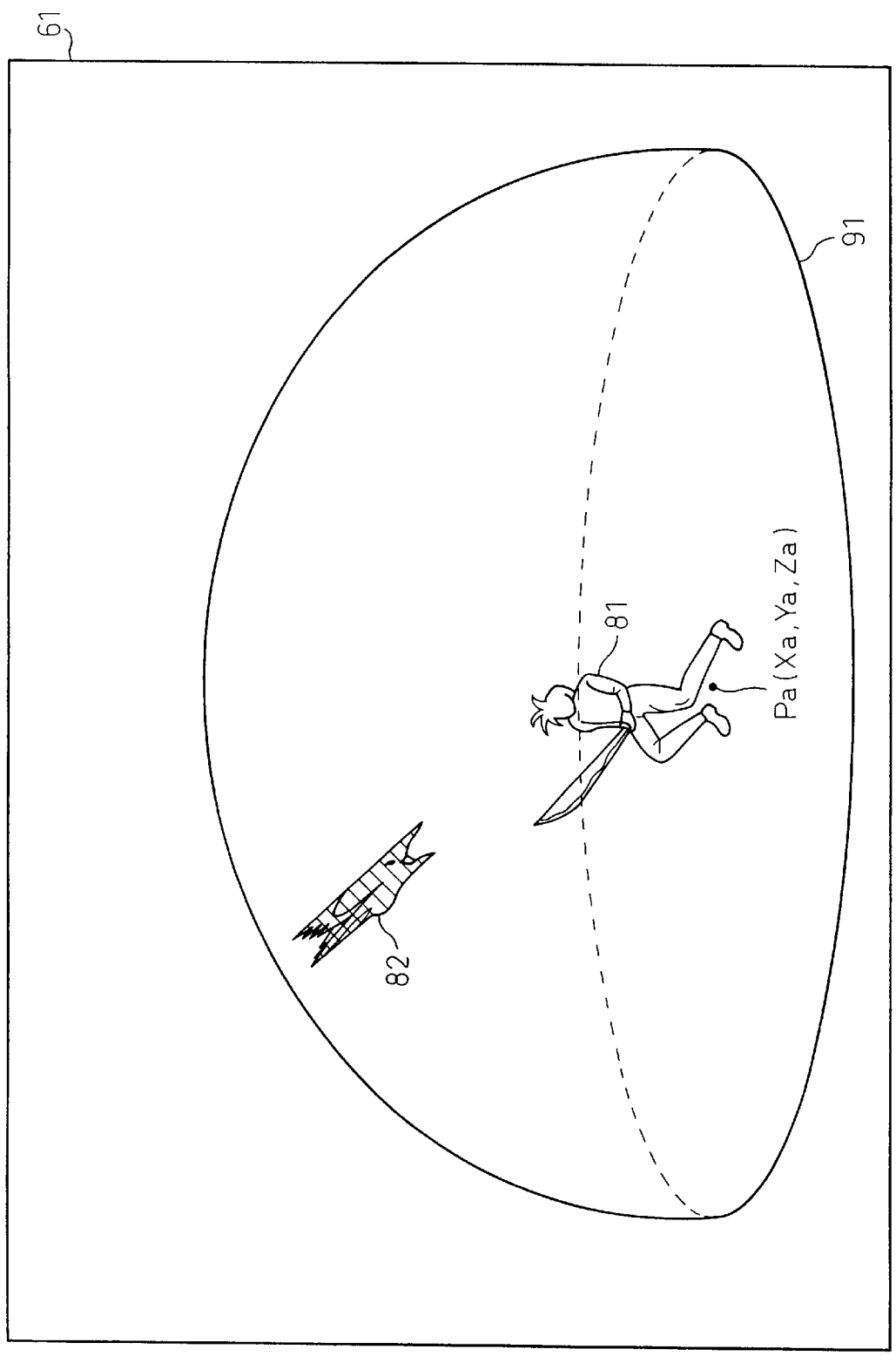
FIG. 17 is a view of an example of a screen display in the battle processing of the first embodiment.

After adjustment of the view point, as shown in the example of the display shown in FIG. 17, the range area 91 is displayed at the display screen 61 (step S11). At that time, the range area 91 is displayed so as to become gradually larger on the display screen 61 centered on the reference coordinate position of the player character. Due to this, the dramatic effect is greater. Note that in the example shown in FIG. 17, the selected magic is for example a "FIREBALL". Further, the range area 91 is basically displayed by a wire frame model. To avoid the illustration from becoming too complicated, in FIG. 17, the wires are omitted (same in FIG. 18). In the illustrated example, the shape of the area of the range area 91 of the "FIREBALL" magic is a hemisphere.

Therefore, the range area 91 is displayed at a position where the center coordinates of the bottom surface of the hemisphere matches the reference coordinate data of the player character 81.

If the range area 91 is displayed, it is judged if there is one or more enemy characters present in the range area 91 (step S12). Specifically, the controller 11 computes if the range area 91 includes the reference coordinate data of an enemy character based on the data of the display position of the range area 91, the shape, size, angle, and other data of the area, and the reference coordinate data of all of the enemy characters obtained at step S1.

When there is not even one enemy character in the range area 91, the routine returns to step S2. When there is one or more enemy characters present, the routine proceeds to step S13 of FIG. 14. Further, for example, as shown in the example of the screen display shown in FIG. 17, highlighting is performed such as temporarily changing the displayed color of the enemy characters 82 positioned in the range area 91 or making the characters blink.

Figure 18:
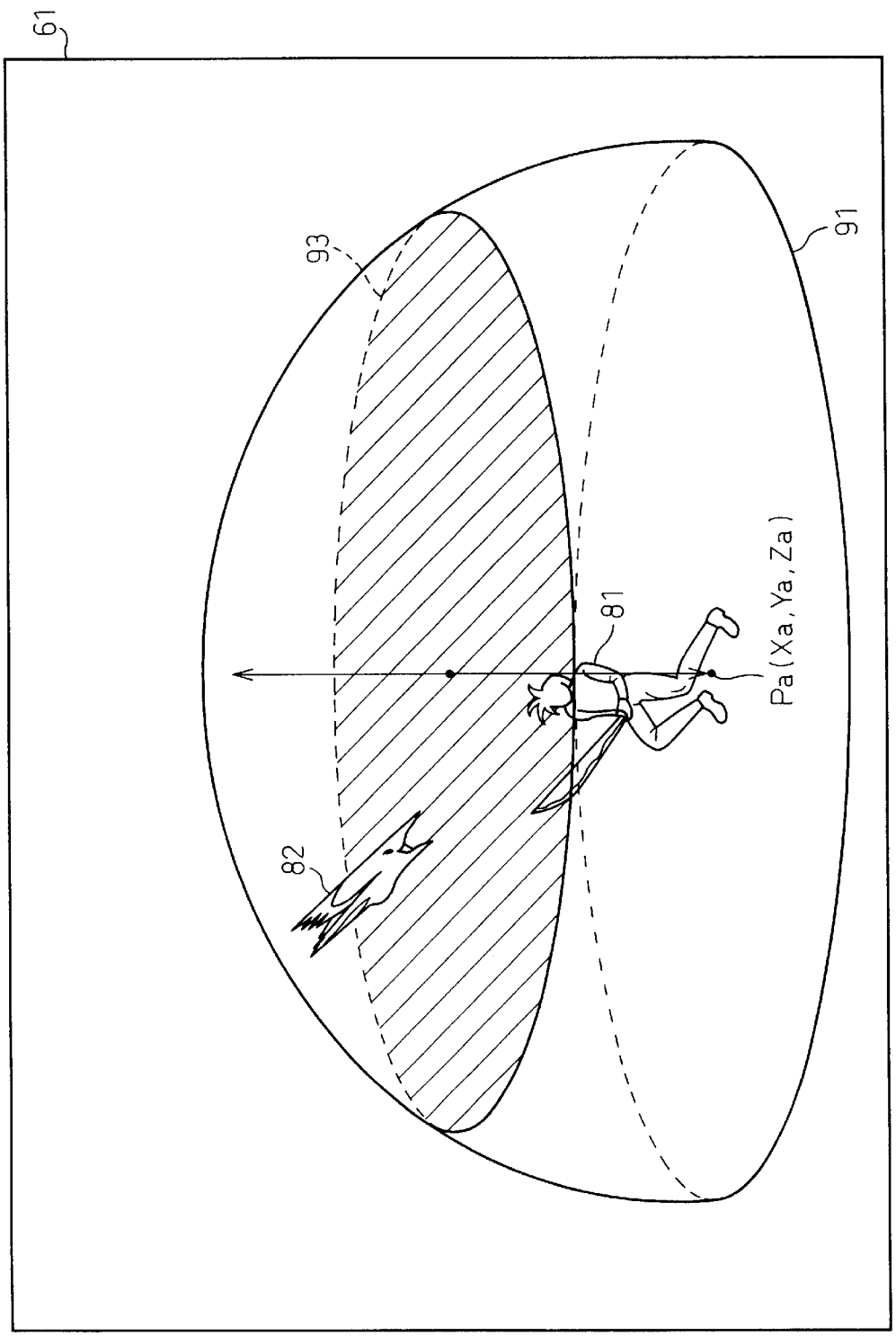
FIG. 18 is a view of an example of a screen display in the battle processing of the first embodiment.

Returning to FIG. 14, after the highlighting, as shown in the example of the display shown in FIG. 18, the display screen 61 displays an effect area setting plane 93 for determining the set height of the effect area (step S14). The effect area setting plane 93 is a plane cutting across the inside of the range area 91 laterally in parallel to the xy plane (bottom surface of hemisphere). The effect area setting plane 93 is moved in the vertical direction, that is, the z-axial direction, in accordance with an input operation of the player. While not particularly limited, the effect area setting plane 93 is for example first displayed at the height of the range area 91, that is, a position of ½ the height in the z-axial direction. At this time, the effect area setting plane 93 may be displayed by a semitransparent color different from its surroundings. If this is done, the visibility of the effect area setting plane 93 is improved.

Returning to FIG. 14, if an operation for vertical movement is performed by the direction controls of the input device 3 after the display of the effect area setting plane 93, the display is controlled so that the effect area setting plane 93 moves vertically accordingly (step S15). During this movement, if the effect area setting plane 93 contacts the enemy character 82 (step S16), highlighting is performed such as temporarily changing the displayed color of the contacted enemy characters 82 or making the enemy character 82 blink (step S17). Note that in this embodiment, if the effect area setting plane 93 and an judgement area for each enemy character set based on the reference coordinate data of the enemy character stored in the fight control table 20 (see FIG. 3) come into contact, the effect area setting plane 93 and the enemy character is judged to have come into contact. If the effect area setting plane 93 does not contact the enemy character 82 (step S 16), the routine jumps to step S18.

Figure 19:
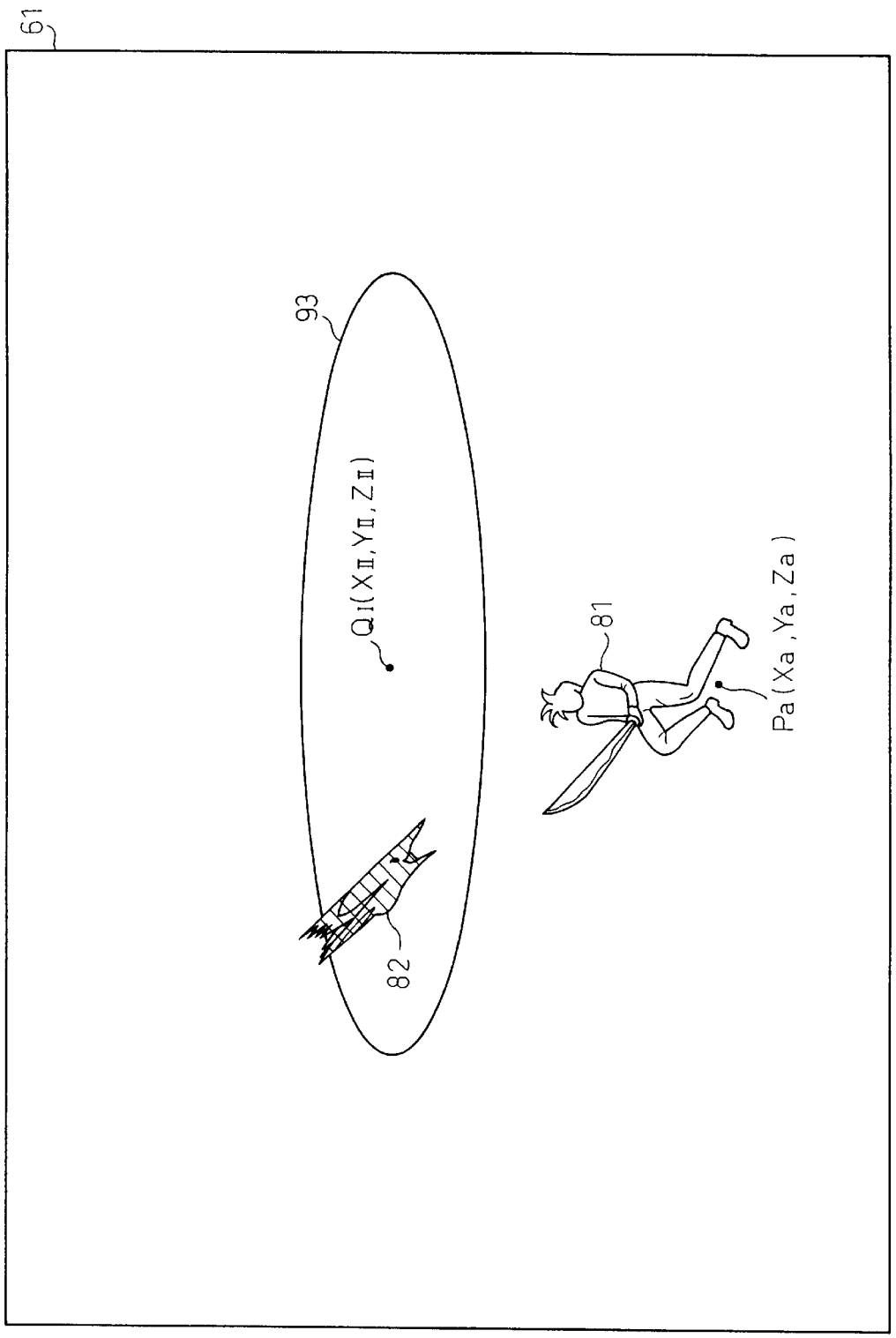
FIG. 19 is a view of an example of a screen display in the battle processing of the first embodiment.

When the height of the effect area setting plane 92 is determined by the input operation of the player (step S18), as shown in the example of the display shown in FIG. 19, the display of the range area 91 is erased from the display screen 61 (step S19). The effect area setting plane 93 remains displayed as it is however. Even if the effect area setting plane 93 does not contact the enemy character at step S16, the height of the effect area setting plane 93 can be determined.

Returning to FIG. 14, the effect area data of the magic specified at step S7 is obtained based on the area setting table 21 (see FIG. 4) (step S20). Further, the center coordinates $Q_1$ ($X_{11}$, $Y_{11}$, $Z_{11}$) of the effect area setting plane 93 are found by computation (step S21). This is done to determine the initial display position of the effect area 92. If the height of the effect area setting plan 92 is not determined by the input operation of the player (step S18), the routine returns to step S16.

Next, as shown by the example of the display shown in FIG. 20, the effect area 92 is displayed on the display screen 61 (step S22). At that time, the center point (or reference point) R ($X_s$, $Y_s$, $Z_s$) of the effect area 92 matches the center coordinates $Q_1$ ($X_{11}$, $Y_{11}$, $Z_{11}$). At this stage, the effect area setting plane 93 is still displayed as it is. Note that in the example shown in FIG. 20, the effect area 92 is displayed by a wire frame model. To avoid the illustration from becoming too complicated, in FIG. 20, the wires are omitted (same in FIG. 21, FIG. 22, and FIG. 23).

Proceeding to FIG. 15, if an operation for vertical and lateral movement is performed on the display screen by the direction controls of the input device 3 after the initial display of the effect area 92, the display is controlled so that the effect area 92 moves vertically and laterally accordingly (step S23). At this time, the effect area 92 can freely move in a range where the center point (or reference point) R ($X_s$, $Y_s$, $Z_s$) is in the effect area setting plane 93.

If the effect area 92 contacts the enemy character 82 during movement of the effect area 92 (step S24), as shown in the example of the display shown in FIG. 21, highlighting is performed such as temporarily changing the displayed color of the contacted enemy characters 82 or making the characters blink (step S25). Note that in this embodiment, if the reference coordinate data of the enemy character stored in the fight control table 20 (see FIG. 3) is included in the effect area 92, the effect area 92 and enemy character is judged to setting plane 93 and an judgement area are judged to have come into contact. If the effect area 92 does not contact the enemy character 82 during movement of the effect area 92 (step S24), the routine jumps to step S26.

Returning to FIG. 15, if the position of the effect area 92 is determined by an input operation of the player (step S26), as shown in the example of the display shown in FIG. 22, the display of the effect area setting plane 93 is erased from the display screen 61 (step S27). Even if the effect area 92 does not contact the enemy character at step S24, the position of the effect area 92 can be determined. If the position of the effect area 92 is not determined by an input operation of the player (step 26), the routine returns to S23.

Returning to FIG. 15, when the position of the effect area 92 is determined, the enemy character 82 positioned in the effect area 92 is specified as being covered by the attack. Next, the attack is authorized (step S28). If the attack is authorized, the specified magic is launched (step S29). At the next fight computation, the values of the fight parameters relating to the magic such as the magic attack power, magic defense power, magic hit rate, magic evasion rate, and intelligence set against the player character 81 and enemy character 82 are used. By the graphic display control, sound output control, etc., the fight scene is played out (step S30).

Next, whether the battle has ended is judged (step S31). When the predetermined conditions for the end of the battle such as the physical power set for the player character becoming zero or all of the enemy characters in the fight being knocked down, the battle processing is ended. On the other hand, when the conditions for the end of the battle are not met, the routine returns to step S2 and the routine repeats from the command input.

According to the first embodiment, the data of the range area 92 and the effect area 92 are provided in advance for each magic. At the time of the fight, the range area 91 of the magic is displayed on the display screen 61 in accordance with the magic selected by the player. The effect area 92 is set in accordance with the input operation of the player at any position in the range area 91. Further, since it is possible to have the effect of the attack reach the inside of the effect area 92 by the launching of the attack, the modes of the fight scenes become more diverse and the tactical nature and interest of the game are enhanced.

Further, according to the first embodiment, since the range area 91 and the effect area 92 are displayed by wire frame models, it is possible to display these areas three-dimensionally. Further, since the wires of the wire frame models are displayed to move along the contours of the areas, it is possible to enhance the three-dimensional appearance of the displayed range area 91 and effect area 92. Therefore, since it is possible to display three-dimensionally the area showing the effective range of attack, it is possible to display an area showing the effective range of attack even in a game playing out a fight in a three-dimensional virtual space.

Further, according to the first embodiment, since the view point is adjusted so that the range area 91, attack area 92, player character 81, and enemy characters 82 present in the range area 91 and attack area 92 fit in one screen, the player can discern the whole fight scene. Further, since the enemy characters present in the range area 91 and in the attack area 92 are highlighted, the enemy characters in the areas 91 and 92 can be easily discerned.

Further, according to the first embodiment, the battle processing program is stored in the program product 4, that is, the CD-ROM. Therefore, the program product 4 can be easily distributed and sold separately from the console 2 as a software product. Further, by using a computer or other hardware to use this software, it becomes possible to easily work the game technology of the first embodiment by the hardware.

Note that the area setting table 21 is not limited to that of the first embodiment and may also be provided with deformation rate, direction, or other fields. Further, the shape of the range area 91 or effect area 92 may be flattened in a specific direction or changed in orientation.

Further, in the first embodiment, the sizes of the range area 91 and the attack area 92 were explained as being predetermined for each type of magic, but the invention is not limited to this. For example, the sizes of the range area 91 and attack area 92 and the degree of deformation of the shapes of the areas can be adjusted based on the level of growth of the player character 81, the value of the magic parameter or wisdom parameter set for the player character 81 (fight parameter), the number of times the magic is used, etc. Further, it is also possible to configure the system so that the closer the set position of the effect area 92 to the player character 81, the larger the size of the effect area 92 and the greater the power of the attack. Further, the range area 91 and the attack area 92 may be shapes defined by the "SHAPE" columns 214 and 217 of the area setting table 21 and of the maximum sizes fitting inside a parallelepiped having the three values stored in the "SIZE" columns 215 and 218 of the area setting table 21 (see FIG. 4) as its length, width, and height.

Figure 23A:
FIGS. 23(a)–23(c) are schematic views for explaining an example of a method of display of an attack area.
Figure 23B:
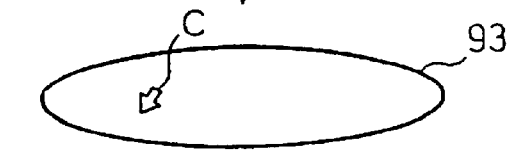
Figure 23C:
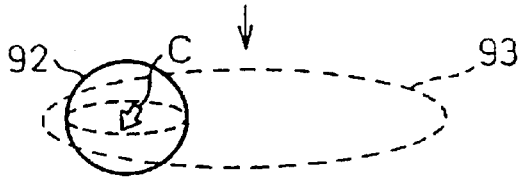

Further, when specifying the position of the effect area 92, as shown in FIG. 23, first, the arrow-shaped cursor C may be displayed at the center of the effect area setting plane 93 as shown in for example FIGS. 23(a)–23(c). In this case, as shown in FIG. 23(b), the cursor C is moved by an input operation. Due to this, the center point (or reference point) of the effect area moves. Further, if the position of the center point (or reference point) is specified, as shown in FIG. 23(c), the display of the effect area setting plane 93 is erased and the effect area 92 is displayed.

Further, in the first embodiment, the range area 91 and the attack area 92 were explained as being set for magic, but the invention is not limited to this. For example, it is also possible to configure the system so that the range area and effect area are set for an attack using a weapon or using of an item in the same way as the magic.

Further, in the first embodiment, the range area 91 and the attack area 92 were explained as being displayed by wire frame models, but the invention is not limited to this. For example, the surfaces of the range area 91 and attack area 92 may also be displayed semitransparently by colors different from their surroundings.

Still further, in the first embodiment, the range area 91 and attack area 92 were explained as being generated as objects in a three-dimensional virtual space, but the invention is not limited to this. For example, the range area 91 and the attack area 92 alone may be separately prepared and positioned together on an image showing the fight scene for a combined display.

Further, in the first embodiment, what the player character attacked was explained to be an enemy character, but the invention is not limited to this. For example, what is attacked may be a wall or other simple object.

(Second Embodiment)

Next, an explanation will be given of a second embodiment of the present invention. The difference of the second embodiment from the first embodiment lies in the point that the time from which each character executes a certain action to when the designation of the next action is allowed is controlled during a fight period. The time is controlled for all characters. For an enemy character, the action is designated or executed by computer. Here, an explanation of the time control for an enemy character will be omitted.

To realize the above time control, the game system 1 is provided with a counting means and authorizing means in addition to the configuration of the first embodiment. The counting means is a means for counting the time during a fight period. The authorizing means is a means for authorizing designation of an act in a fight for a character reaching a time preset for each character when the time counted by the counting means reaches that time. Specifically, the counting means is realized by a timer counter built in the controller 11. Further, the controller 11 has the function of the authorizing means.

Figure 24:
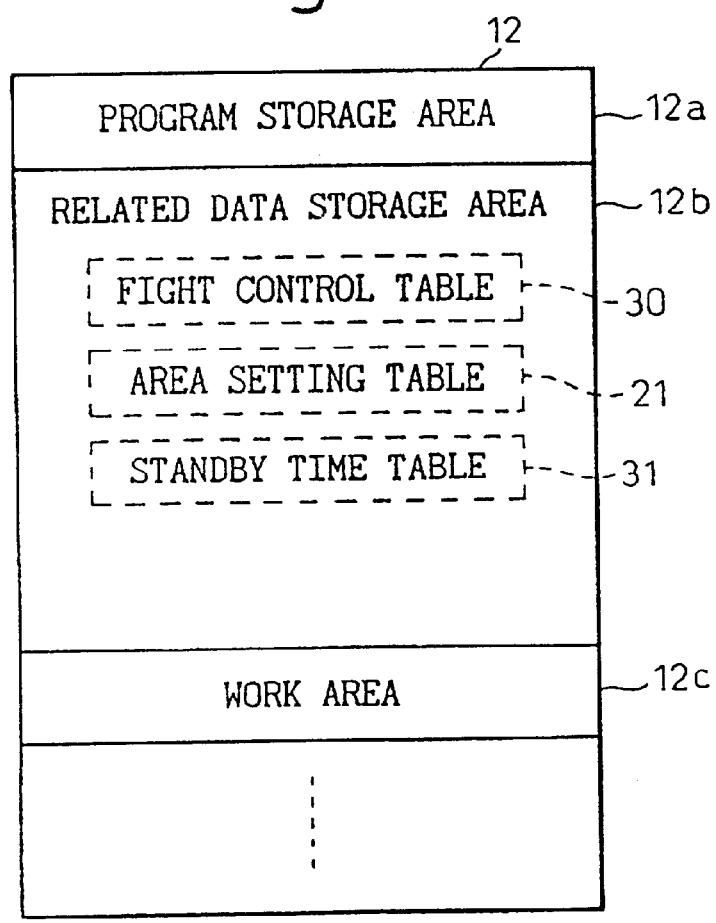
FIG. 24 is a view of a memory configuration of a RAM in a second embodiment.

Further, by adding the factor of time to the factors controlling the actions of the characters during the fight period, in the second embodiment, the memory configuration of the RAM 12 becomes different from that of the first embodiment. That is, as shown in FIG. 24, the related data storage area 12b of the RAM 12 stores a standby time table 31. Further, instead of the fight control table 20, a fight control table 30 configured to store data of the counted time is used. Further, in the second embodiment, during the battle processing, it is judged if the count has been started and if the counted time has reached the time set for each character.

The rest of the configuration and functions are the same as those of the first embodiment. Further, the hardware configuration of the game system 1 and the area setting table 21 are the same as in the first embodiment. Components the same as in the first embodiment are given the same reference numerals as in the first embodiment and duplicate explanations are omitted. Next, an explanation will be given of the points different from the first embodiment.

FIG. 24 is a view of a memory configuration of the RAM 12 in the second embodiment.

The related data storage area 12b of the RAM 12 stores the standby time table 31, fight control table 30, and area setting table 21.

FIG. 25 is a view of a data structure of the standby time table 31.

The standby time table 31 stores settings of the time from after when a character executes an action to when the designation of the next action is authorized for each character appearing in the game (hereinafter referred to as the "standby time"). The setting of the standby time is the count of the timer counter incremented by 1 at predetermined time intervals. The setting of the standby time is set for each character in advance by a game program. The standby time table 31 has a "CHARACTER NAME" column 311 storing the names (or character INFORMATION DISCLOSURE STATEMENT) of the player character and enemy characters and a "STANDBY TIME DATA" column 312 storing the settings of the standby times for the characters.

FIG. 26 is a view of a data structure of the fight control table 30.

The fight control table 30 is configured with a "COUNTED TIME" column 301 added to the fight control table 20 of the first embodiment (see FIG. 3). The "COUNTED TIME" column 301 stores, while continuously updating, the counted time data, that is, the counted time (count) for each character in the fight. The rest of the configuration of the fight control table 30 is the same as that of the first embodiment, so explanation will be omitted.

Next, an explanation will be made of the battle processing in the second embodiment.

In the same way as the first embodiment, at startup, the controller 11 reads the program and data necessary for execution of the game from the program product 4, that is, CD-ROM, through the CD-ROM drive 16 and transfers it to the RAM 12 based on an operating system stored in the built-in ROM. Further, the controller 11 executes the program transferred to the RAM 12 to execute the various processing described below. Note that among the control operations performed by the game system 1, there are operations where circuits other than the controller 11 cooperate with the controller 11 for the actual control. For the convenience of the explanation, below, an explanation will be made assuming that control involving the controller 11 is direct control by the controller 11. Further, in the same way as the first embodiment, to facilitate understanding of the invention, detailed explanations of the read operation of the data from the CD-ROM and the transfer to the RAM 12 are omitted.

Figure 27:
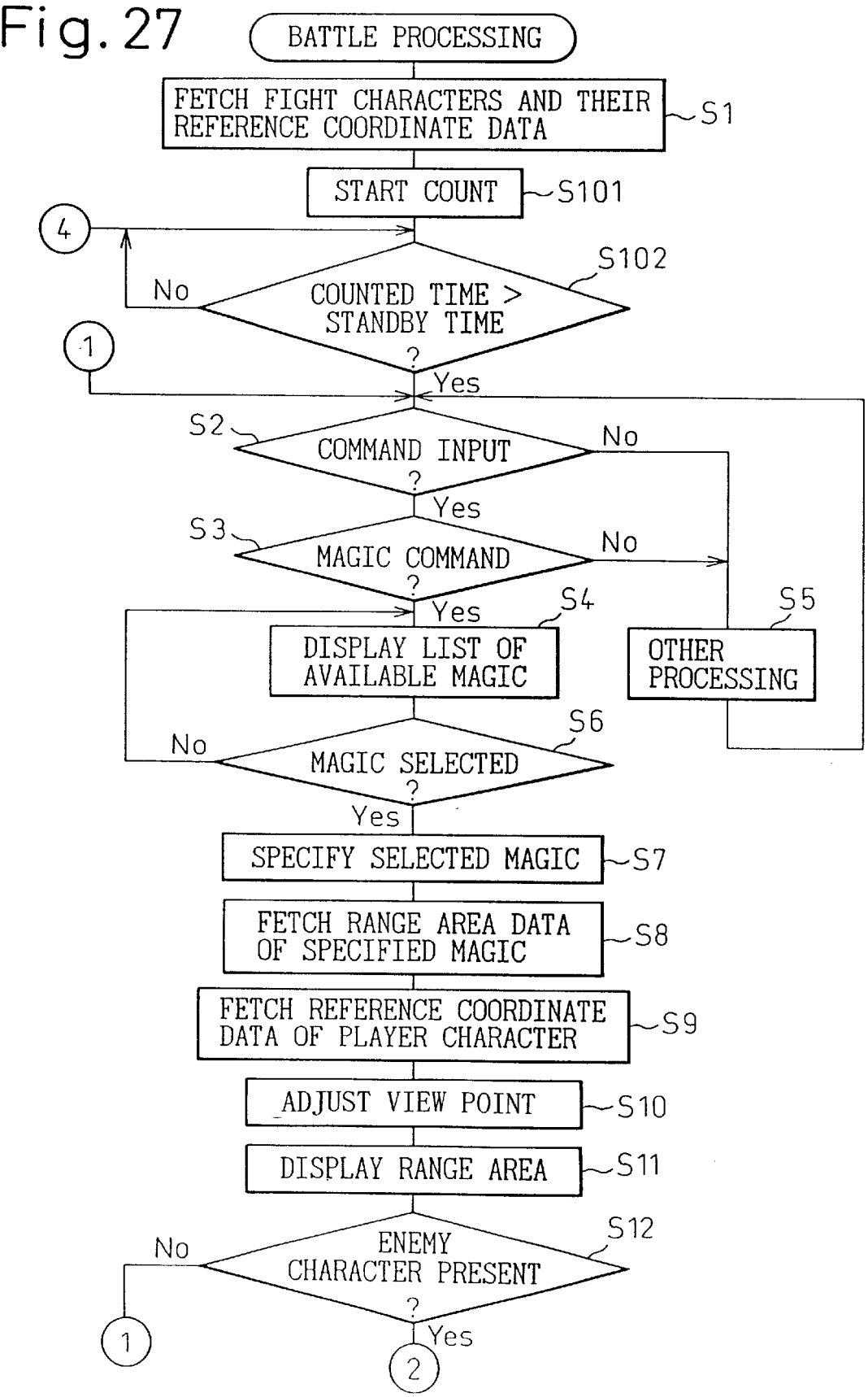
FIG. 27 is a flow chart of battle processing of a second embodiment.
Figure 28:
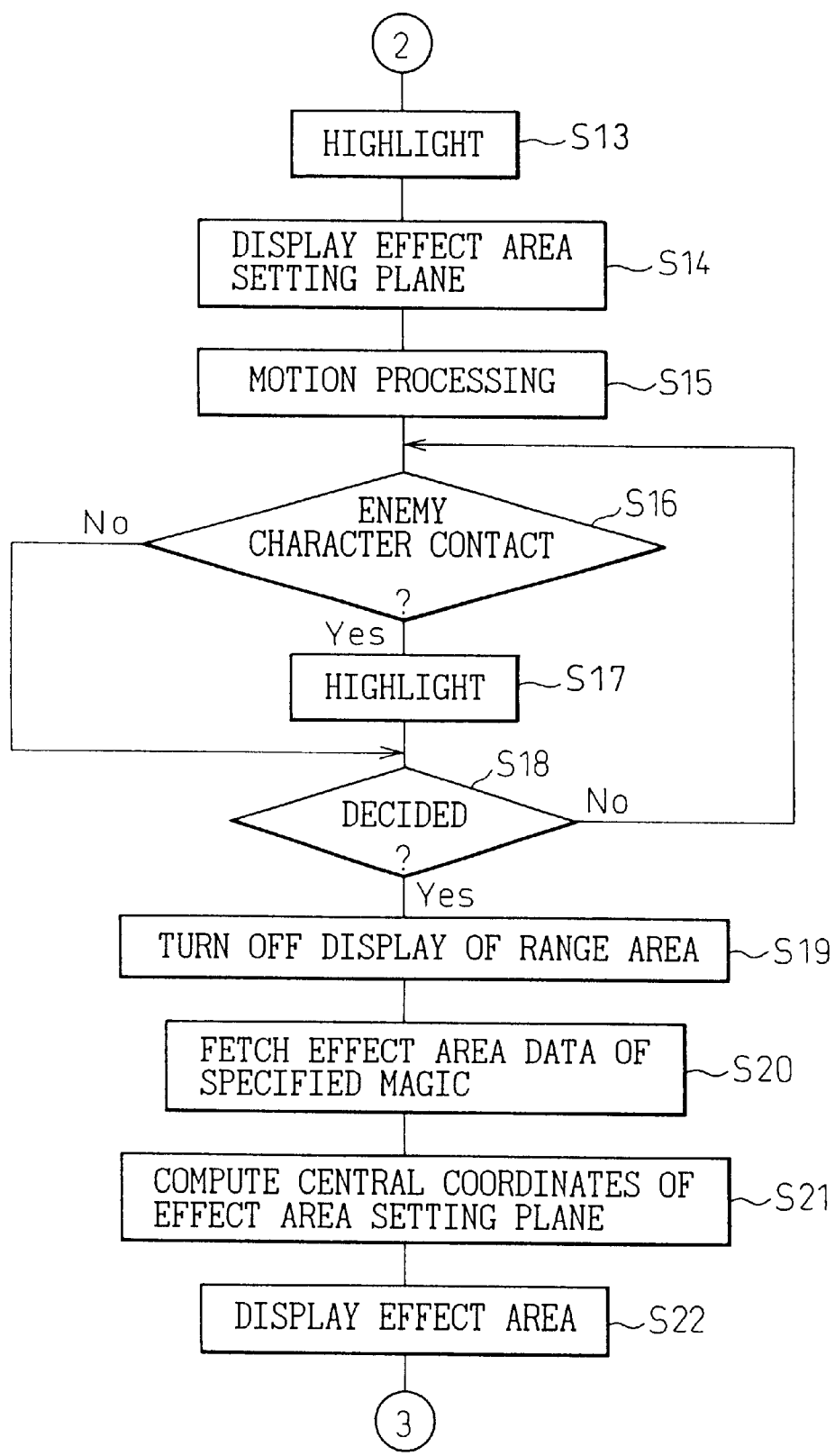
FIG. 28 is a flow chart continuing from FIG. 27.
Figure 29:
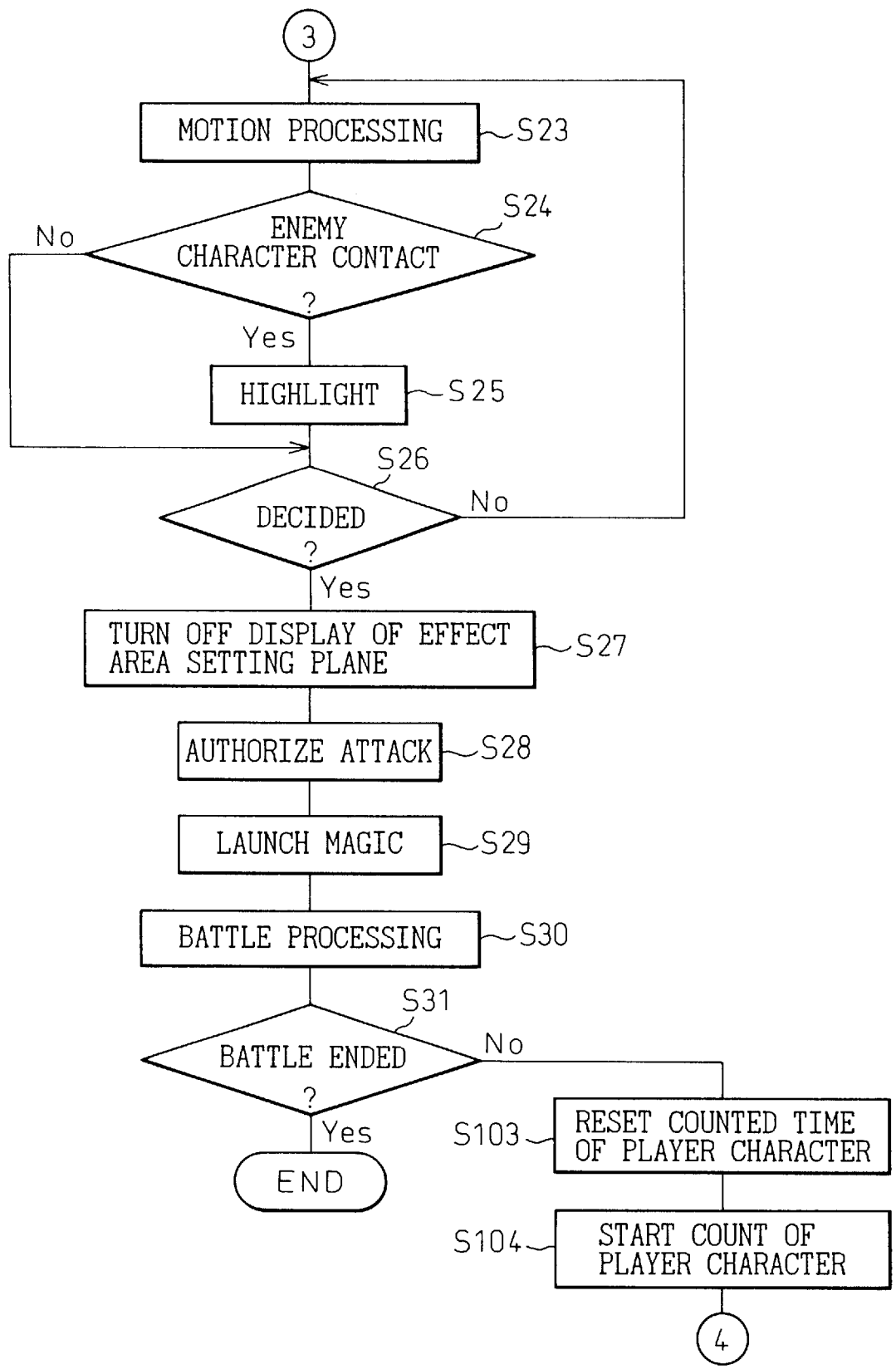
FIG. 29 is a flow chart continuing from FIG. 28.

FIG. 27 to FIG. 29 are flow charts of battle processing of the second embodiment.

An explanation will be given of the battle processing with reference to the example of the screen display shown in these figures and FIG. 30.

As shown in FIG. 27, when the battle processing begins, first, all of the enemy characters and the player character displayed on the display screen 61 at the start of the battle processing and the player character are specified as being covered by the current fight. Next, the reference coordinate data of the specified characters placed in the virtual three-dimensional space is obtained. The information of the specified characters and the reference coordinate data are stored in the fight control table 30 (step S1). Note that the reference coordinate data stored in the fight control table 30 is sequentially updated in accordance with movement of the characters during the fight.

Next, a count is started for all characters participating in the fight, that is, for all characters registered in the fight control table 30. The time data during the counting is stored in the "COUNTED TIME" column 301 of the fight control table 30 (step 101). Further, it is judged if the counted time for the player character has reached a standby time set in advance for the player character based on the standby time table 31 (see FIG. 25) (step S102). If the predetermined standby time has been reached, command input is authorized for the player. When the predetermined standby time has not been reached, the command input is not authorized.

When a command is input by a player, it is judged if the input command is a command relating to a fight (step S2). The processing from step S3 to S30 is the same as the processing after step S2 of the flow charts shown in FIG. 13 to FIG. 15 of the first embodiment. Therefore, in the second embodiment, the explanation of step S3 to step S30 in the flow charts of FIG. 27 to FIG. 29 will be omitted. At step S31, when the result of judgement of whether the battle has ended is that the battle is continuing, the counted time of the player character is reset (step S103). Next, the count of the time is started for the player character again (step S104). Next, the routine returns to step S102 and the subsequent processing is repeated until the battle ends. Note that timing of resetting of the counted time of the player character and the resumption of the count is not limited to the time of the end of the action of the player character and may be set to any timing from the start to end of the action of the player character.

Figure 30:
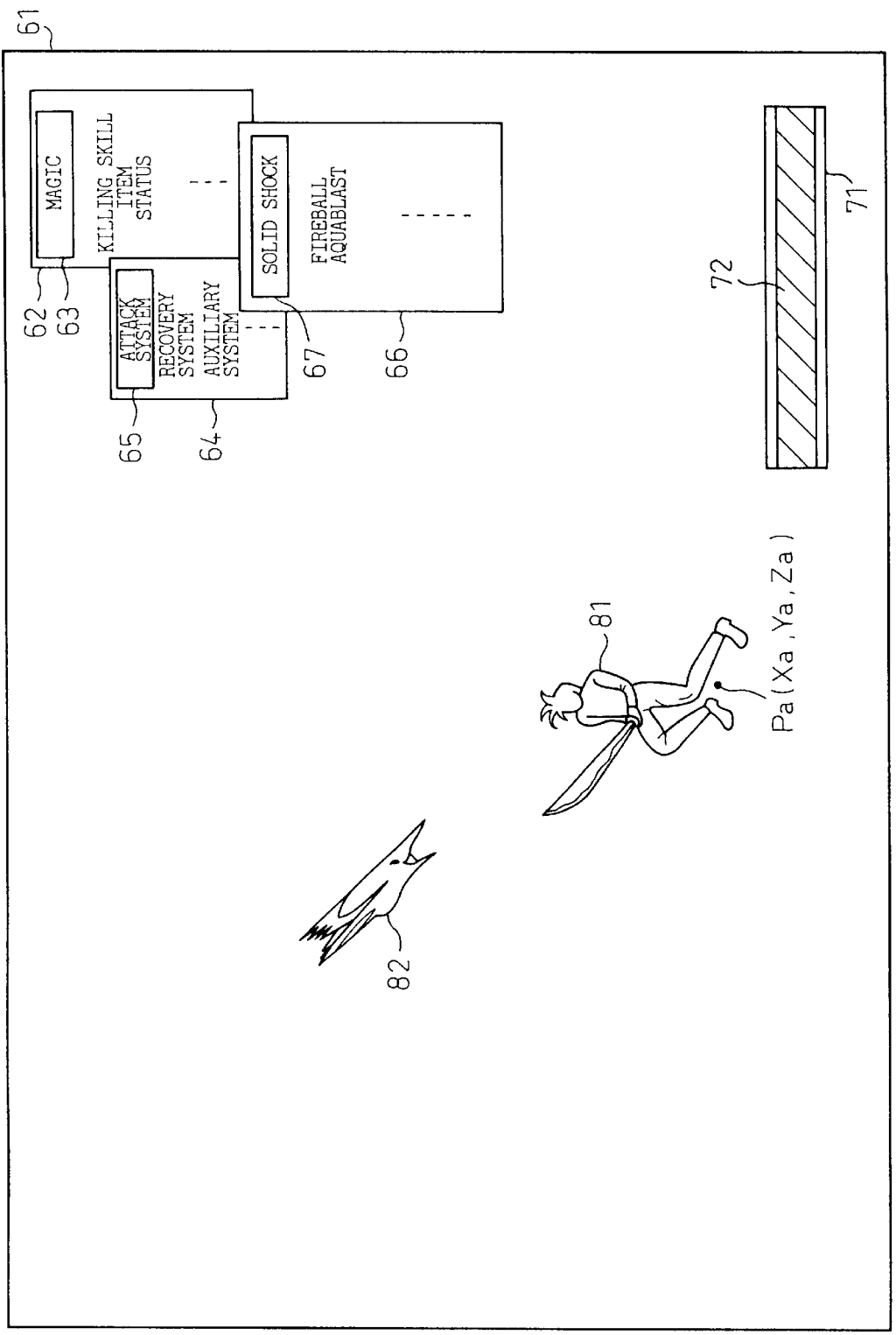
FIG. 30 is a view of an example of a screen display in battle processing of the second embodiment.

At step S102, to enable the player to visually discern if the counted time of the player character has reached the predetermined standby time, the display screen 61 displays a standby time gauge 71 and meter bar 72, as shown in the example of the screen display shown in FIG. 30.

FIG. 31(a) to 31(d) are views of an example of the change of the display of the standby time gauge 71. The total length of the standby time gauge 71 corresponds to the total time (total count) from the time of the end of one action of the player character 81 to when the instruction of the next action is authorized. The meter bar 72 provided in the gauge 71 shows the amount of the counted time from the time of start of the fight or from the time when the player character 81 ends one action, that is, the current count status. The meter bar 72 (hatching area) is displayed so as to extend gradually in for example the right direction along with an increase in the time already counted as shown successively in FIG. 31(a) to 31(d).

Figure 31A:
FIGS. 31(a)–31(d) show an example of the change in the standby time gauge shown on the screen by the battle processing of the second embodiment.
Figure 31B:
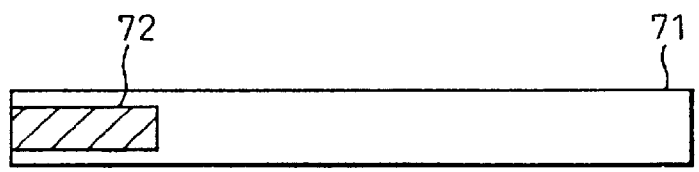
Figure 31C:
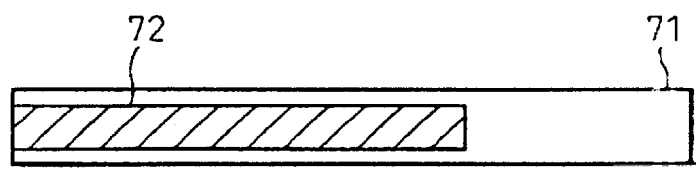
Figure 31D:
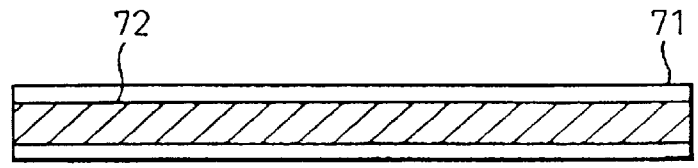

As shown in FIG. 31(d), when the meter bar 72 reaches the total length of the standby time gauge 71, instruction of the next action of the player character 81 is authorized. When the player character 81 executes one action, the length of the meter bar 72, that is, the counted time, is reset. That is, the meter bar 72 returns to the state shown in FIG. 31(a). Further, the processing for time counting and the processing for updating the display of the meter bar 72 in accordance with the counted time are repeated until the end of the battle.

Using the information shown by the standby time gauge 71 and the meter bar 72, the player can discern at one glance how much more time has to pass before the next action can be instructed for the player character 81.

According to the second embodiment, in addition to the control of the display for the attack area etc. in accordance with the attack action of the character explained in the first embodiment, the timing at which the attack action can be performed is controlled based on the time elapsed from the execution of that action, so the flow of the game is changed and the game is made more interesting.

The present invention was explained in detail above based on the first and second embodiments, but the invention is not limited to these embodiments. Suitable changes may of course be made within the scope and spirit of the invention.

For example, in the above embodiments, the explanation was made of the case of realization of the present invention using a home game system as a platform. The present invention, however, may also be realized using a personal computer or other general computer or arcade game machine as a platform. Further, the present invention may also be realized using a cellular phone, hand held data terminal, car navigation system, or other communications terminal as a platform.

Further, in the above embodiments, the program or data for realization of the present invention was stored in a CD-ROM and that CD-ROM used as a program product. The program product, however, is not limited to a CD-ROM. It may also be a digital versatile disc (DVD) or other computer readable magnetic or optomagnetic medium or semiconductor memory.

Further, the program and data for realizing the present invention are not limited to forms supplied by a CD-ROM or other program product 4 which can be loaded into and unloaded from a game system or computer. That is, the program and data for realizing the present invention may also be of a form downloaded from another apparatus on the network 100 connected through the communications line 99 by the communications interface 17 shown in FIG. 1. Further, the program and data may also be stored in a memory of another apparatus on the network 100 connected through the communications line 99 and that program and data successively stored in the RAM 12 through the communications line 99.

Summarizing the effects of the invention, according to the present invention, when an attack on an enemy character is instructed by operation of the player, an effective range of the attack is set based on the position of the player character and the set effective range of the attack is displayed three-dimensionally as an attack area, so the modes of the fight scene become more diverse and the tactical nature and interest of the game are enhanced.

While the invention has been described by reference to specific embodiments chosen for purposes of illustration, it should be apparent that numerous modifications could be made thereto by those skilled in the art without departing from the basic concept and scope of the invention.

The present disclosure relates to subject matter contained in priority Japanese Patent Application Nos. HEI 11-185575, filed on Jun. 30, 1999, the contents of which is herein expressly incorporated by reference in its entirety.

What is claimed is:

1. A computer readable recording medium on which is recorded a game program for causing a computer to:
set an effective range of an attack on a target object, positioned in an attack area set in a virtual space in response to a first player operation, based on a position of a player character when said attack is instructed;
display three-dimensionally the set effective range of attack as the attack area; and
launch the player character's attack on the displayed attack area in response to a second player operation.

2. The computer readable recording medium according to claim 1, wherein the recording medium records the game program which further causes the computer to select an attack area from an effect area showing three-dimensionally a range where an attack effect reaches when launching the attack, and an attackable area showing three-dimensionally a range where said effect area can be set.

3. The computer readable recording medium according to claim 1, wherein setting the effective range further comprises setting the effective attack range for a type of attack designated based on a preset correspondence between the type of attack and a stored effective attack range.

4. The computer readable recording medium according to claim 1, wherein the displaying three-dimensionally further comprises displaying the attack area as a wire frame model.

5. The computer readable recording medium according to claim 4, wherein the computer displays said wire frame model as a line graphic following a virtual interface between said attack area and other areas, and displays the display state of the line graphic so that the line graphic moves along the interface.

6. The computer readable recording medium according to claim 1, wherein before setting the effective area, the computer:
starts a count from a predetermined timing between when action of the player character starts and when the action ends; and
authorizes an instruction for attack by the player character when the counted time reaches a time preset for the player character.

7. A computer readable recording medium on which is recorded a game program for causing a computer to:
set an effective range of an attack on a target object, covered by the attack on a display screen, in response to an operation of a player, based on a position of a player character when said attack is instructed;
display three-dimensionally the set effect range of attack as an attack area;
authorize the attack on a target object positioned in the displayed attack area; and
obtain a battle result based on the authorized attack on the target object.

8. The computer readable recording medium according to claim 7, wherein said computer selects an attack area from an effect area showing three-dimensionally a range where an attack effect reaches when launching the attack, and an attackable area showing three-dimensionally a range where said effect area can be set.

9. The computer readable recording medium according to claim 7, wherein setting the effective range further comprises setting the effective attack range for a type of attack designated based on a preset correspondence between the type of attack and a stored effective range of attack.

10. The computer readable recording medium according to claim 7, wherein the displaying three-dimensionally further comprises displaying the attack area as a wire frame model.

11. The computer readable recording medium according to claim 10, wherein the computer displays said wire frame model as a line graphic following a virtual interface between said attack area and other areas, and displays the display state of the line graphic so that the line graphic moves along the interface.

12. The computer readable recording medium according to claim 7, wherein the computer further highlights the target object contained in the attack area after the three-dimensional display and before the authorization of the attack.

13. The computer readable recording medium according to claim 7, wherein the computer further adjusts the position of a view point so that the player character, the attack area corresponding to the designated attack, and the target object positioned in or near the attack area fit into one screen, after the three-dimensional display and before the authorization of the attack.

14. The computer readable recording medium according to claim 7, wherein before setting the effective area, the computer:
  starts a count from a predetermined timing between when action of the player character starts and when the action ends; and
  authorizes an instruction for attack by the player character when the counted time reaches a time preset for the player character.

15. A computer readable recording medium on which is recorded a game program for causing a computer to:
  form an attack screen for a player character and a target object covered by an attack on a display screen;
    display, based on a position of the player character, an attack area three-dimensionally displaying an effective area of an attack on the target object on said attack screen when said attack is instructed by an operation input;
  highlight the target object positioned in said displayed attack area;
  authorize the attack on the highlighted target object; and
  obtain a battle result based on the player character's authorized attack on the target object.

16. A method of controlling a display of a game comprising:
  setting an effective range of an attack on a target object, positioned in an attack area set in a virtual space in response to a first player operation based on a position of a player character when said attack is instructed;
  displaying three-dimensionally the set effective range of attack as an attack area; and
  launching the player character's attack on the displayed attack area in response to a second player operation.

17. The method of controlling a display of a game as set forth in claim 16, in which setting the effective range further comprises setting the effective attack range for a type of attack designated based on a preset correspondence between the type of attack and a stored effective attack range.

18. The method of controlling a display of a game as set forth in claim 16, further comprising displaying a wire frame model as a line graphic following a virtual interface between said attack area and other areas, and displaying the display state of the line graphic so that the line graphic moves along the interface.

19. The method of controlling a display of a game as set forth in claim 16, further comprising, before setting the effective area:
  starting a count from a predetermined timing between when action of the play character starts and when the action ends; and
  authorizing an instruction for attack by the player character when the counted time reaches a time preset for the player character.

20. A method of controlling a display of a game comprising:
  setting an effective range of an attack on a target object, covered by the attack on a display screen, in response to a player operation, based on a position of a player character when said attack is instructed;
  displaying three-dimensionally the set effective range of attack as an attack area;
  authorizing the attack on a target object positioned in the displayed attack area; and
  obtaining a battle result based on the player character's authorized attack on the target object.

21. The method of controlling a display of a game as set forth in claim 20, in which setting the effective range further comprises setting the effective range of the attack for a type of attack designated based on a preset correspondence between the type of attack and a stored effective attack range.

22. The method of controlling a display of a game as set forth in claim 20, further comprising displaying a wire frame model as a line graphic following a virtual interface between said attack area and other areas, and displaying the display state of the line graphic so that the line graphic moves along the interface.

23. The method of controlling a display of a game as set forth in claim 20, further comprising adjusting the position of a view point so that the player character, the attack area corresponding to the designated attack, and the target object positioned in or near the attack area fit into one screen, after the three-dimensional display and before the authorization of the attack.

24. The method of controlling a display of a game as set forth in claim 20, further comprising, before setting the effective area:
  starting a count from a predetermined timing between when action of the player character starts and when the action ends; and
  authorizing an instruction for attack for the player character when the counted time reaches a time preset for the player character.

25. A method of controlling a display of a game comprising:
  forming an attack screen for a player character and a target object covered by an attack on a display screen:
    displaying, based on a position of the player character, an attack area three-dimensionally displaying an effective area of an attack on the target object on said attack screen when said attack is instructed by operation input;
  highlighting the target object positioned in said displayed attack area;
  authorizing the attack on the highlighted target object; and
  obtaining a battle result based on the player character's authorized attack on the target object.

26. An apparatus comprising a computer for controlling a program and a recording medium on which is recorded the program for causing the computer to:
  set an effective range of an attack on a target object, positioned in an attack area set in a virtual space, based on a position of a player character when said attack is instructed; and
  display three-dimensionally the set effective range of attack as the attack area.

27. An apparatus comprising a computer for controlling a program and a recording medium on which is recorded the program for causing the computer to:
  set an effective range of an attack on a target object, covered by the attack on a display screen, in response to an operation input, based on a position of a player character when said attack is instructed;
  display three-dimensionally the set effective range of attack as the attack area;

authorize the attack on a target object positioned in the displayed attack area; and obtain a battle result based on the player character's authorized attack on the target object.

28. An apparatus comprising a computer for controlling a program and a recording medium on which is recorded the program for causing the computer to:

form an attack screen for a player character and a target object covered by an attack on a display screen;

display, based on a position of the player character, an attack area three-dimensionally displaying an effective area of an attack on a target object on said attack screen when said attack is instructed in response to an operation input;

highlighting the target object positioned in said displayed attack area;

authorize the attack on the highlighted target object; and obtain a battle result based on the player character's authorized attack on the target object.

* * * * *